US006734903B1

(12) United States Patent
Takeda et al.

(10) Patent No.: US 6,734,903 B1
(45) Date of Patent: *May 11, 2004

(54) IMAGE SENSING APPARATUS

(75) Inventors: Nobuhiro Takeda, Kawasaki (JP); Akihiro Fujiwara, Yokosuka (JP); Shigeo Ogura, Tokyo (JP); Hiroyuki Wada, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/391,388

(22) Filed: Feb. 27, 1995

(30) Foreign Application Priority Data

Feb. 28, 1994 (JP) .............................................. 6-029502
Feb. 28, 1994 (JP) .............................................. 6-029506
Feb. 28, 1994 (JP) .............................................. 6-029508

(51) Int. Cl.$^7$ ............................................ H04N 5/225
(52) U.S. Cl. ..................................................... 348/219.1
(58) Field of Search ................................. 348/218, 222, 348/208, 219, 220, 221, 64, 169, 233, 376, 208.1, 218.1, 219.1, 220.1, 221.1, 222.1; H04N 5/232

(56) References Cited

U.S. PATENT DOCUMENTS 4,568,970 A * 2/1986 Rockstead .................... 358/91
4,837,628 A * 6/1989 Sasaki ......................... 358/209

(List continued on next page.)

FOREIGN PATENT DOCUMENTS

| EP | 0395913 | | 7/1990 | |
| EP | 0410419 | | 1/1991 | |
| EP | 0481230 | | 4/1992 | |
| GB | 2 055 006 | * | 2/1981 | ............ H04N/5/26 |
| JP | 0149269 | * | 6/1985 | |
| JP | 6139340 | * | 10/1992 | |
| JP | 6139340 | | 5/1994 | |
| JP | 60149269 | * | 8/1995 | |

OTHER PUBLICATIONS

Abstract, JP6139340, May 20, 1994, "Image Forming Method and Image Pickup Device", Atsushi.

(List continued on next page.)

Primary Examiner—Thai Tran
Assistant Examiner—Christopher Onuaku
(74) Attorney, Agent, or Firm—Morgan & Finnegan, L.L.P.

(57) ABSTRACT

In an image sensing apparatus of this embodiment, a variable angle prism for preventing a camera shake is used to attain a pixel shift. Consequently, low resolution images free from a blur and high-resolution images obtained by the pixel shift can be selectively obtained with an extremely simple arrangement. Whether a resolution increasing function is to be executed is properly determined in accordance with photographing conditions. Therefore, the resolution increasing function has no adverse effect on other functions. In addition, a power-saving effect can be enhanced since an unnecessary resolution increasing function is not performed. Since the resolution can be further increased by using a conventional camera shake preventing device, a larger amount of a high-frequency component can be detected. Consequently, focus detection can be performed accurately.

28 Claims, 16 Drawing Sheets

U.S. PATENT DOCUMENTS

| | | | |
|---|---|---|---|
| 4,992,878 A | * 2/1991 | Hersh | 358/213.28 |
| 5,023,719 A | * 6/1991 | Zwirn | 358/100 |
| 5,107,293 A | * 4/1992 | Sekine et al. | 354/430 |
| 5,153,633 A | 10/1992 | Otani | 354/430 |
| 5,363,136 A | * 11/1994 | Sztanko et al. | 348/207 |
| 5,400,070 A | * 3/1995 | Johnson et al. | 348/219 |
| 5,512,974 A | * 4/1996 | Abe et al. | 348/169 |
| 5,875,034 A | * 2/1999 | Shintani et al. | 348/233 |

OTHER PUBLICATIONS

Abstract, JP6339057, Jun. 12, 1994, "Image Pickup Device and Image Pickup System Using The Same", Etsuro.

Abstract, JP6014269, Jun. 8, 1985, "Television Camera", Tatsuki.

Abstract, JP6319614, Jul. 13, 1988, "Image Stabilizing Device", Akira.

Abstract, JP5095517, Apr. 16, 1993, "High Resolution Image Pick–up Device", Hiroyoshi.

NHK Laboratories Note, (1992) Dec., No. 410, "An HDTV 2/3–Inch CCD Hand–Held Camera", Mitani, et al., pp. 1–11.

* cited by examiner

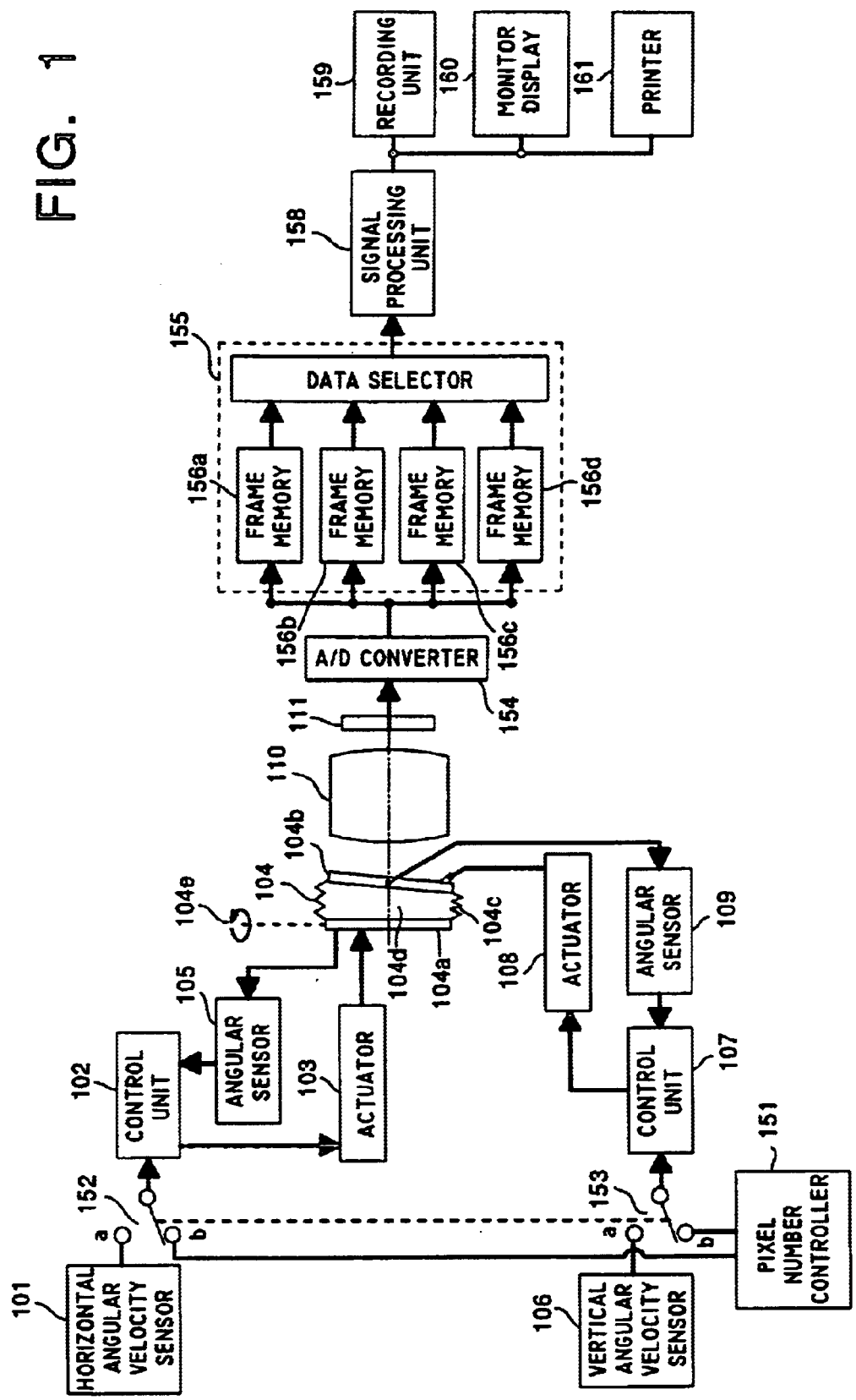

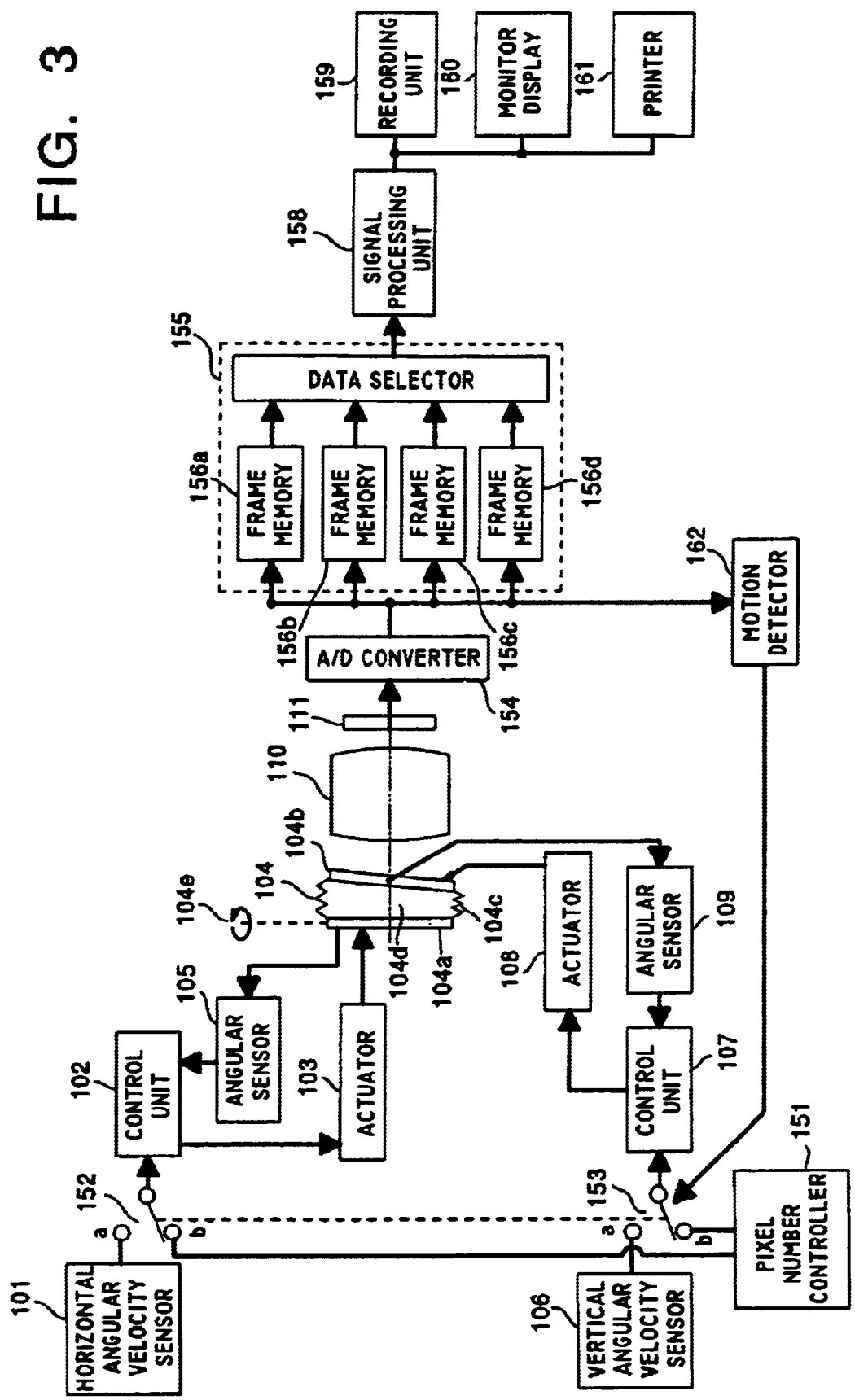

IMAGE SENSING APPARATUS

BACKGROUND OF THE INVENTION

The present invention relates to an image sensing apparatus and, more particularly, to a high-resolution image sensing apparatus using an image sensor such as a charge coupled device (CCD).

A recent advance of image sensors such as a charge coupled device (CCD) has achieved a high image quality, a low price, and a small size of image sensing apparatuses, e.g., household compact video cameras and still video cameras. Consequently, a satisfactory image quality can be obtained by a television standard of, e.g., NTSC. In addition, camera shake correction is currently performed in video cameras and the like, and this further improves the image quality of dynamic images.

A camera shake is a phenomenon in which photographed images move vertically or horizontally while a user is performing photographing by holding a video camera in his or her hands, since the hands or the body of the user slightly moves independently of the user's intention. Images thus photographed give a viewer a considerable uncomfortableness when reproduced on a television monitor or the like.

To avoid this camera shake phenomenon, conventional video cameras make use of, e.g., a variable angle prism (to be referred to as a "VAP" hereinafter).

A practical example of an arrangement of a conventional image sensing apparatus including a VAP for camera shake correction will be described below with reference to FIG. 15.

In FIG. 15, a VAP 104 is constituted by coupling two glass plates 104a and 104b via a bellows-like spring member 104c and sealing an optically transparent liquid 104d in the space surrounded by the two glass plates 104a and 104b and the spring member 104c. Shafts 104e and 104f provided in the glass plates 104a and 104b are connected to an actuator 103 for horizontal driving and an actuator 108 for vertical driving, respectively. Therefore, the glass plate 104a is rotated horizontally, and the glass plate 104b is rotated vertically.

Note that the VAP 104 is described in Japanese Patent Laid-Open No. 2-12518 and so a detailed description thereof will be omitted.

A horizontal angular velocity sensor 101 detects an angular velocity caused by a horizontal motion of the image sensing apparatus resulting from a camera shake or the like. A control unit 102 performs an arithmetic operation for the detection signal from the angular velocity sensor 101 such that this horizontal motion of the image sensing apparatus is corrected, and detects and supplies an acceleration component to the actuator 103. This actuator 103 drives the glass plate 104a of the VAP 104 horizontally.

The rotational angle of the glass plate 104a which can be horizontally rotated by the actuator 103 is detected by an angle sensor 105. The control unit 102 performs an arithmetic operation for this detected rotational angle and supplies the result to the actuator 103.

A vertical angular velocity sensor 106 detects an angular velocity caused by a vertical motion of the image sensing apparatus resulting from a camera shake or the like. A control unit 107 performs an arithmetic operation for the detection signal from the angular velocity sensor 106 such that this vertical motion of the image sensing apparatus is corrected, and detects and supplies an acceleration component to the actuator 108. This actuator 108 drives the glass plate 104b of the VAP 104 vertically.

The rotational angle of the glass plate 104b which can be vertically rotated by the actuator 108 is detected by an angle sensor 109. The control unit 107 performs an arithmetic operation for this detected rotational angle and supplies the result to the actuator 108.

An image sensing optical system 110 forms an image of an object to be photographed on an image sensor 111. This image sensor 111 is constituted by, e.g., a CCD. A two dimensional solid state CCD is used in conventional image sensing apparatuses such as video cameras. An output from the image sensor 111 is output to a recording apparatus or a television monitor through a signal processing circuit (not shown).

In the conventional image sensing apparatus with the above arrangement, the horizontal and vertical angular velocities caused by a camera shake are detected. On the basis of the angular velocities detected, the actuators move the VAP horizontally and vertically to refract incident light, thereby performing control such that the image of an object to be photographed does not move on the image sensing plane of the image sensor. Consequently, the camera shake is corrected.

On the other hand, with recent spread of image sensing apparatuses, an increasing demand has arisen for a higher image quality. To meet this demand, it is being attempted to increase the number of pixels of an image sensor such as a CCD in an image sensing apparatus or to develop a high-speed I/O apparatus or an image information compressing/decoding apparatus.

For example, the number of pixels of a conventional two-dimensional solid state CCD is normally 400,000, and the number of pixels of even a high-resolution CCD is at most 2,000,000. These pixel numbers currently available are unsatisfactory to obtain a sufficient resolution necessary for images, hard copies, and computer graphics to be displayed on large screens.

The following methods, therefore, are disclosed as a method of realizing a high image quality with a limited number of pixels of an image sensor.

(1) A method in which an image of an object to be photographed is divided by a prism and photographed by a plurality of image sensors, as found in some presently available video camera recorders.

(2) A method as proposed in, e.g., Japanese Patent Laid-Open No. 60-250789, in which an image region of a photographing optical system is split by, e.g., a secondary imaging optical system, and the individual split regions are photographed by a plurality of image sensors and then synthesized.

(3) A method of pixel shift proposed in, e.g., Japanese Patent Publication Nos. 50-13052, 59-18909, and 59-43035. In this method, an element for splitting a light beam, such as a dichroic mirror or a half mirror, is arranged on the image plane side of an image sensing optical system, and a plurality of area sensors are arranged to be shifted from each other by an amount corresponding to a half pixel pitch or smaller. In this method it is possible to obtain, from a plurality of resulting images, information containing pixels in a number larger than the number of pixels of the area sensors. Also, "Highvision ⅔-inch compact CCD camera using dual green method" in Television Society Magazine, "Image Information Engineering and Broadcasting Technology", Vol. 47, No. 2, 1993 has reported a method in which two of three CCDs for receiving separated light beams from a trichromatic separation prism are arranged such that their pixels are shifted from each other. In this method an object to be photographed is photographed with this pixel-shifted arrangement.

(4) Japanese Patent Publication No. 57-31701 or 64-863 has disclosed a method by which a pixel shift is performed by moving the position of incident light to an image sensor relative to the image sensor in synchronism with the read timing of an output electrical signal from the sensor. This is accomplished by, e.g., inserting a birefringence polarizing element into a photographing optical system and controlling the element. By periodically photographing the resulting images, it is possible to obtain information containing pixels in a number larger than the number of pixels of the image sensor. Research and development of this pixel shifting method have been made extensively to date.

As discussed above, the camera shake preventing function and the resolution increasing function have been developed in conventional image sensing apparatuses. Unfortunately, in these conventional image sensing apparatuses the camera shake preventing function and the resolution increasing function are independent of each other. Therefore, the conventional image sensing apparatuses must have independent arrangements to include both of the two functions. An image sensing apparatus including both these functions, therefore, is difficult to manufacture at a low cost and miniaturize.

In addition, in a conventional image sensing apparatus which realizes a high-resolution by using the pixel shifting method as described above, this pixel shifting function and various other automatic adjusting functions of the image sensing apparatus may interfere with each other, thereby causing a function failure. As an example, if a pixel shift is performed by slightly vibrating a focusing lens group or an image sensor in the optical axis direction while an automatic focusing device is operating using TV signal AF (Auto Focus), no stable peak value output of a luminance signal can be obtained. This degrades the original performance of the automatic focusing device. Also, if a pixel shift is done while another automatic adjusting device is in operation, out-of-focus images or over exposed-images result in some cases. In addition, if a pixel shift is performed during zooming, the moving amount of the position of incident light to an image sensor cannot be held constant. Consequently, it may become impossible to obtain a satisfactory image quality.

Furthermore, since a pixel shift is done although no satisfactory effect can be expected, the resolution increasing function operates unnecessarily, consuming an extra power. This is especially a serious problem in portable image sensing apparatuses in which power is supplied by a battery.

SUMMARY OF THE INVENTION

It is an object of the present invention to provide an image sensing apparatus including both of a camera shake preventing function and a resolution increasing function with a simple arrangement.

According to the present invention, the foregoing object is attained by providing an image sensing apparatus comprising image forming means for forming an image of an object to be photographed, image sensing means for photographing the image of the object formed by the image forming means, displacing means for displacing the image of the object formed by the image forming means and the image sensing means relative to each other, and control means for performing switching between a first image sensing mode in which the displacing means performs a vibration correction to yield a low resolution image and a second image sensing mode in which the displacing means performs a pixel shift to yield a high-resolution image.

In accordance with the present invention as described above, the first or second image sensing mode is selected either arbitrarily by a user or automatically. Consequently, when dynamic images are required, information of dynamic images free from a blur can be obtained by moving the relative positions of an image of an object to be photographed, which is formed by an optical system, and an image sensor by an amount by which a camera shake is corrected. When a high-resolution is necessary, the relative positions of the image of the object formed by the optical system and the image sensor are finely moved to photograph a plurality of images, and these images are synthesized.

It is another object of the present invention to provide an image sensing apparatus capable of properly determining whether a resolution increasing function is to be executed, thereby enhancing a power-saving effect.

According to the present invention, the foregoing object is achieved by providing an image sensing apparatus comprising image forming means for forming an image of an object to be photographed, image sensing means for photographing the image of the object formed by the image forming means, displacing means for displacing the image of the object formed by the image forming means and the image sensing means relative to each other, synthesizing means for obtaining a high-resolution image by synthesizing a plurality of images of the object obtained by performing a pixel shift by the displacing means, changing means for changing photographing conditions, and control means for determining, in accordance with the photographing conditions changed by the changing means, whether the displacing means is to be driven.

In accordance with the present invention as described above, driving of the displacing means for performing a pixel shift can be controlled in accordance with the photographing conditions. Consequently, an unnecessary pixel shift is not performed.

It is another object of the present invention to provide an image sensing apparatus capable of further increasing the resolution by using an image sensor with a limited number of pixels.

According to the present invention, the foregoing object is attained by providing an image sensing apparatus comprising image forming means for forming an image of an object to be photographed, image sensing means for photographing the image of the object formed by the image forming means, displacing means for displacing the image of the object formed by the image forming means and the image sensing means relative to each other, synthesizing means for obtaining a high-resolution image by synthesizing a plurality of images of the object obtained by performing a pixel shift by the displacing means, and vibration correcting means for selectively performing a vibration correction by using the displacing means.

In accordance with the present invention as described above, the resolution can be further increased in addition to being able to perform a vibration correction.

The invention is particularly advantageous since there can be provided an image sensing apparatus by which an image recording mode is selected either arbitrarily by a user or automatically, and so it is possible to selectively obtain low resolution images free from a blur caused by a vibration such as a camera shake and high-resolution images. Since these two types of images are formed by using a common arrangement, the configuration of the image sensing apparatus is exceedingly simplified.

In addition, whether the resolution increasing function is to be executed is properly determined. Consequently the power-saving effect is enhanced, and the resolution increasing function is prevented from having an adverse influence on other operations of the apparatus.

Furthermore, since a high-resolution can be realized by using a conventional camera shake preventing device, a larger amount of a high-frequency component can be detected. This makes an accurate focus detection feasible.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the arrangement of an image sensing apparatus according to the first embodiment of the present invention;

FIG. 3 is a block diagram showing the arrangement of an image sensing apparatus according to the second embodiment of the present invention;

DESCRIPTION OF THE PREFERRED EMBODIMENTS

Preferred embodiments of the present invention will now be described in detail in accordance with the accompanying drawings.

1st Embodiment

Figure 15:
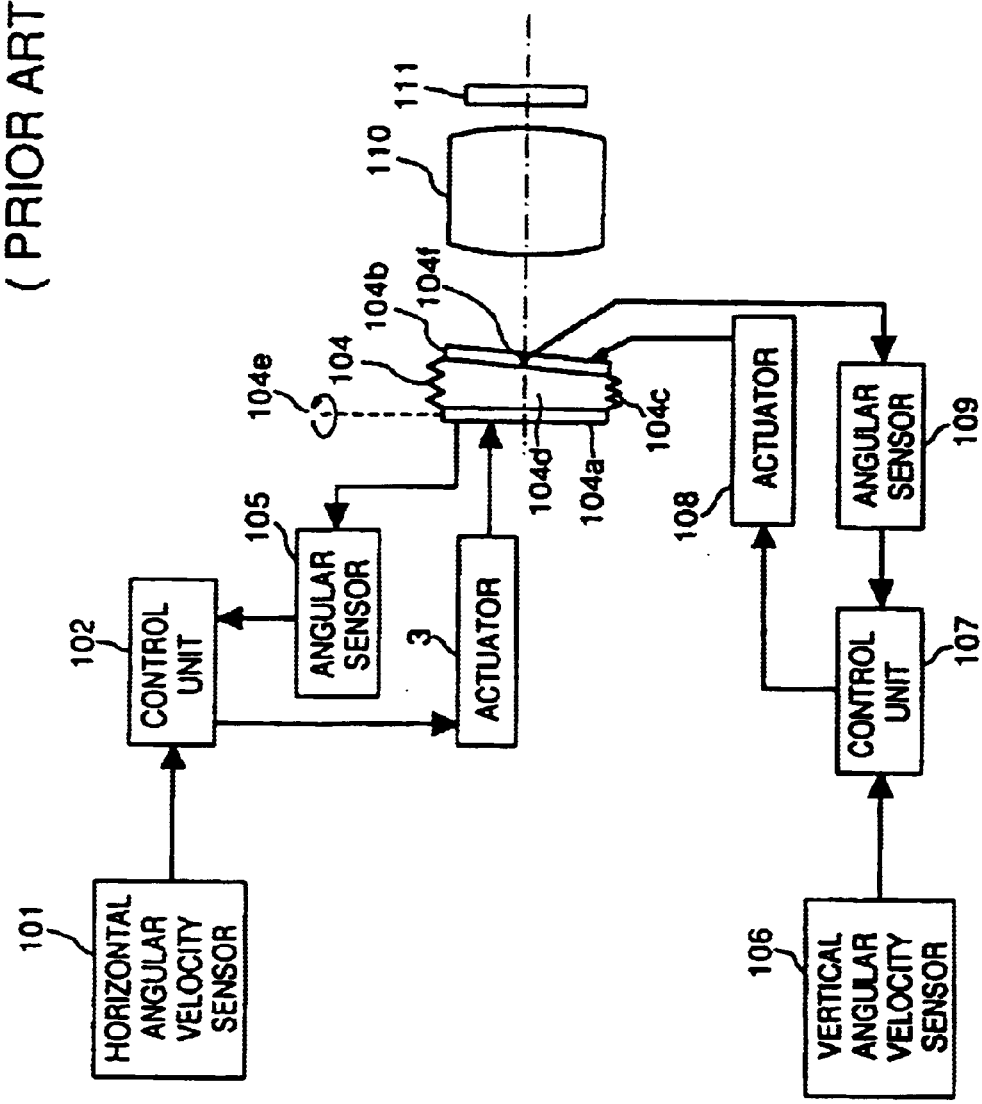
FIG. 15 is a block diagram showing an illustrative arrangement of a conventional image sensing apparatus.

FIG. 1 is a block diagram showing the basic arrangement of an image sensing apparatus according to the first embodiment of the present invention. In FIG. 1, the same reference numerals as in FIG. 15 which illustrates one conventional example denote the same parts, and a detailed description thereof will be omitted.

Referring to FIG. 1, reference numeral 151 denotes a pixel number controller 151. In an image sensor 111, light-receiving portions of individual pixels are arranged in two directions, the X and Y directions, with a spacing larger than the light-receiving portion of one pixel. In this embodiment, the relative positions of an image of an object to be photographed, which is formed by an image sensing optical system 110, and the image sensor 111 are displaced, and the position of a VAP 104 is changed such that the light-receiving portions of the individual pixels of the image sensor 111 apparently cover a light-insensitive portion between the light-receiving portions. The pixel number controller 151 outputs a control signal for this purpose to control units 102 and 107. On the basis of the output control signal from the pixel number controller 151, the VAP 104 is driven by actuators 103 and 108.

To use the image sensing apparatus of this embodiment, a user first determines the operation mode. Reference numerals 152 and 153 are mode switches for this operation. The image sensing apparatus of this embodiment has a first image sensing mode in which camera shake prevention is executed although the resolution is relatively low, and a second image sensing mode in which the resolution is relatively high but no camera shake prevention is performed. Each of the mode switches 152 and 153 is closed to a position a in the first image sensing mode and to a position b in the second image sensing mode. In the first image sensing mode, therefore, the VAP 104 is so controlled as to correct a blur caused by a vibration such as a camera shake on the basis of horizontal and vertical angular velocity information (acceleration information). In the second image sensing mode, on the other hand, the VAP 104 is so controlled that the number of pixels is seemingly increased, i.e., the light-receiving portions of the pixels apparently cover the light-insensitive region between the light-receiving portions.

An analog signal obtained by the image sensor 111 is converted into a digital signal by an A/D converter 154 and applied to a scan converting unit 155 including frame memories 156a to 156d. In the first image sensing mode, the scan converting unit 155 does not function. That is, the digital image signal is always written in, e.g., the frame memory 156a and output intact via a data selector 157. In the second image sensing mode, on the other hand, the scan converting unit 155 stores the output digital image signal from the A/D converter 154 divisionally in frame memories 106a to 106d using a method to be described in detail later. The data selector 157 of the scan converting unit 155 outputs a high-resolution image by alternately reading the frame memories 156a to 156d. The output signal in which the number of pixels is increased by the scan converting unit 155 is output to a recording unit 159, a monitor display 160, or a printer 161 through a signal processing unit 158.

Figure 2B:
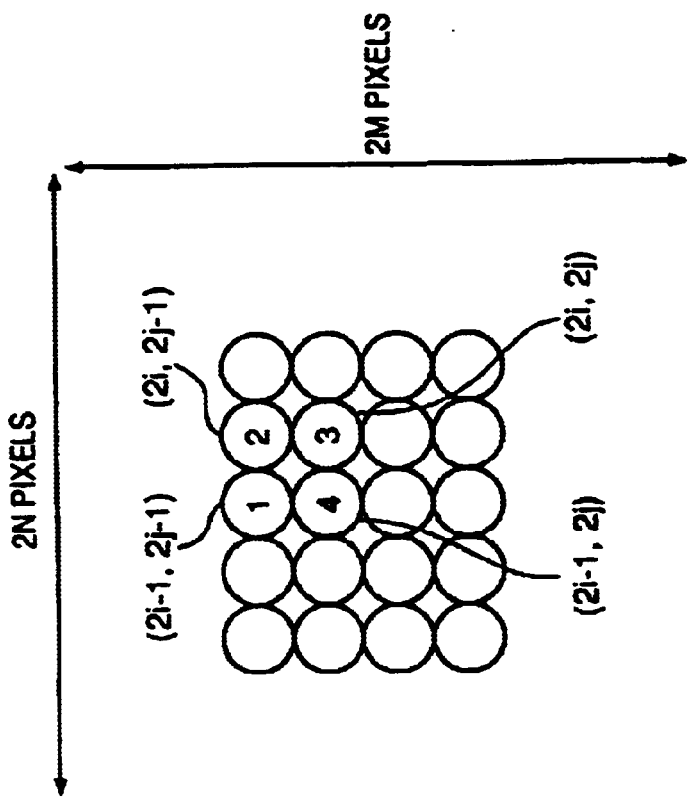
FIGS. 2A and 2B are views showing the relationship between a pixel arrangement and an image, and the pixel arrangement of a high-resolution image after synthesis, respectively, in a second image sensing mode of the first embodiment.
Figure 2A:
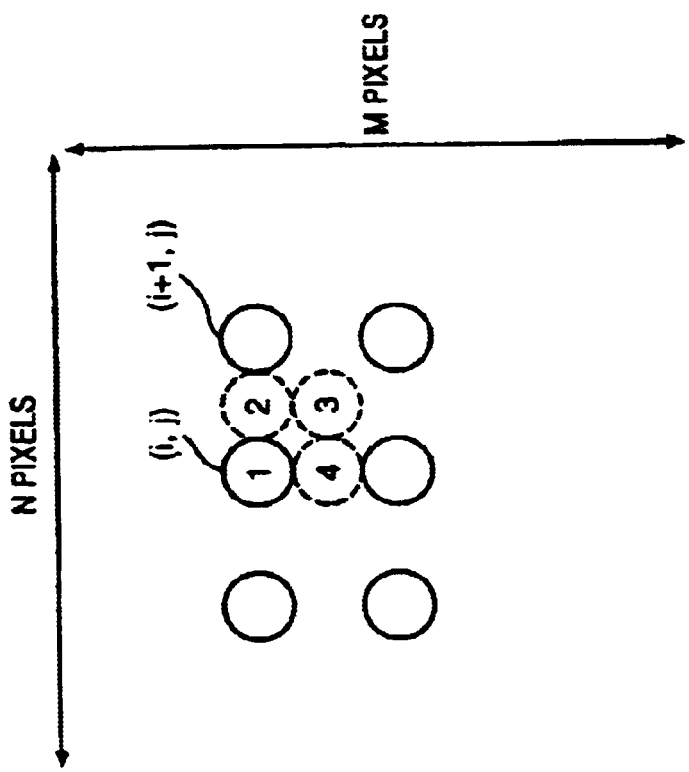

Details of the second image sensing mode for obtaining high-resolution images will be described below. FIGS. 2A and 2B are plan views each showing, in a time series manner, a relative movement between the light-receiving portion of the image sensor 111 and an image of an object to be photographed in the image sensing apparatus of this embodiment. Note that in FIGS. 2A and 2B, it is assumed that an image of an object to be photographed is fixed in position. FIG. 2A is a view for explaining the pixel arrangement in the light-receiving portion of the image sensor 111. In FIG. 2A, the light-receiving portion of the image sensor 111 consists of N×M pixels, i.e., N pixels in the X direction and M pixels in the Y direction. For simplicity of explanation, some of these pixels are extracted in FIG. 2A. Of the extracted pixels, a pixel of interest is given a pixel number, "1", and its position is indicated by coordinates (i,j). FIG. 2B shows the pixel arrangement obtained by synthesis when the data selector 157 alternately reads the frame memories 156a to 156d.

Referring to FIG. 2A, in the light-receiving portion the pixel of interest is moved relatively in order of "1"→"2"→"3"→"4" for each frame of the image sensor 111 by the VAP 104 which is driven by the actuators 103 and 108 on the basis of the control signal from the pixel number controller 151. That is, the pixel of interest is shifted by ½ of the distance between individual light-receiving portions. Assuming the frames corresponding to the pixel positions "1" to "4" in FIG. 2A are first to fourth frames, the frame period of an image synthesized by the data selector 157 is given by the sum of the first to fourth frame periods.

In each of the first to fourth frame periods, therefore, the image data from the image sensor 111 are sequentially stored in the corresponding frame memory. The data thus stored are read out by the data selector 157 and finally recorded, displayed, or printed. An image obtained as the final output at this time is synthesized as illustrated in FIG. 2B. Referring to FIG. 2B, the total number of pixels is 2N×2M, and pixels photographed during the individual corresponding frame periods by the positions "1" to "4" of the pixel of interest, FIG. 2A, are present at positions $(2i-1, 2i-j)$, $(2i,2j-1)$, $(2i-1,2j)$, and $(2i,2j)$. That is, the resolution is doubled in both the X and Y directions.

The above explanation is made assuming that an image of an object to be photographed is fixed in position. In practice, since an image of an object is refracted by the VAP 104, the relative position of the image with respect to the image sensor 111 is displaced.

As discussed above, the image sensing apparatus according to this embodiment includes the first image sensing mode in which camera shake prevention is performed although the resolution is low, and the second image sensing mode in which the resolution is high but no camera shake prevention is done. Consequently, a user can selectively obtain and output high-resolution images and images free from a blur.

It is also possible to output high-resolution images thus photographed as a dynamic image by repeatedly performing photographing in the second image sensing mode described above. Furthermore, during photographing in the first image sensing mode, the operation mode can be switched to the second image sensing mode only for one cycle from the first to fourth frames mentioned above. This makes it possible to obtain a still image with a desired high-resolution.

2nd Embodiment

The second embodiment of the present invention will be described below.

FIG. 3 is a block diagram showing the arrangement of an image sensing apparatus according to the second embodiment of the present invention. In FIG. 3, the same reference numerals as in FIG. 15 which illustrate one conventional example denote the same parts, and a detailed description thereof will be omitted.

Referring to FIG. 3, reference numeral 162 denotes a motion detector for detecting the motion of an object to be photographed from a signal obtained by A/D converting the output from an image sensor 111. A motion detection method in this second embodiment can be, e.g., the method described in Japanese Patent Laid-Open No. 1-98563. In this method, a plurality of images photographed at different times (fields) are compared in units of fine blocks, thereby detecting the motion vector of the object. It is of course possible to employ other well-known methods of motion detection.

Image sensing processing in the second embodiment having the above arrangement will be described below. As with the image sensing apparatus of the first embodiment discussed above, the image sensing apparatus of the second embodiment has a first image sensing mode for preventing a camera shake and a second image sensing mode for obtaining high-resolution images. To photograph an object to be photographed by using the image sensing apparatus of the second embodiment, mode switches 152 and 153 are first closed to their respective positions a to perform photographing in the first image sensing mode. If the motion detector 162 determines that the object is moving, the image sensing apparatus immediately performs recording, display, or the like in the first image sensing mode as it is.

On the other hand, if the motion detector 162 determines that the object is at rest, the mode switches 152 and 153 are closed to their respective positions b, thereby automatically switching the mode of the image sensing apparatus to the second image sensing mode for obtaining a high-resolution.

As described above, in the second embodiment the photographing mode is automatically switched between the first and second modes in accordance with the moving amount of an object to be photographed. This makes it possible to perform photographing in the first image sensing mode if an object is moving, and in the second image sensing mode if an object is at rest. Consequently, optimum images can be obtained constantly.

In the above first and second embodiments, in the high-resolution second image sensing mode the number of pixels is increased at the same magnification in the X and Y directions of an image of an object to be photographed. It is of course possible to increase the number of pixels at different magnifications in the X and Y directions. It is also possible to shift an image of an object and the image sensor 111 relative to each other only in, e.g., the X direction.

In addition, in the above embodiments an image of an object to be photographed is displaced such that the individual light-receiving portions of the image sensor 111 apparently cover the light-insensitive region between the light-receiving portions. An output received during the displacement of each light-receiving portion is displayed or recorded as an output from one pixel. This is equivalent to improving the resolution in both the X and Y directions. However, the present invention is not limited to the above embodiments. For example, the number of pixels can be increased by displacing an image of an object to be photographed such that the light-receiving portions apparently overlap each other.

Figure 4B:
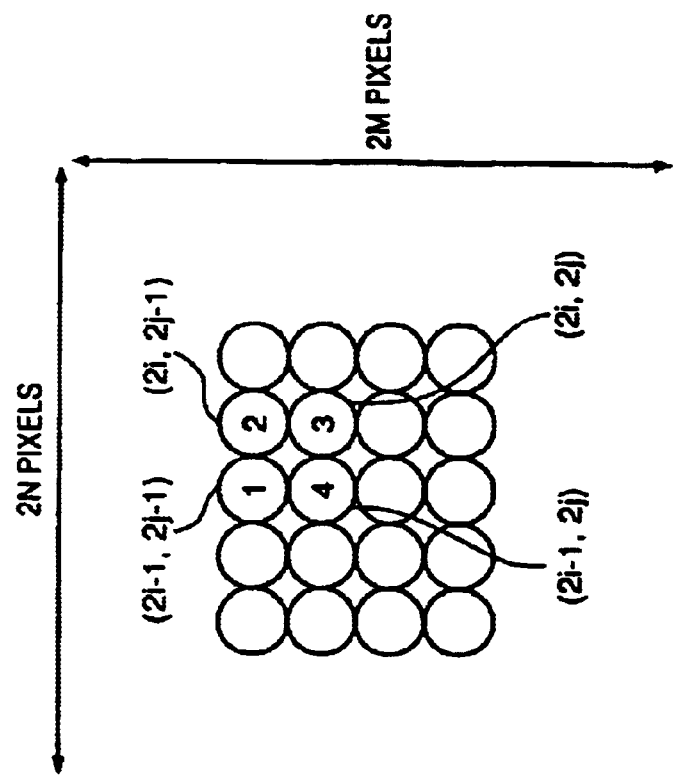
FIGS. 4A and 4B are views showing the relationship between a pixel arrangement and an image, and the pixel arrangement of a high-resolution image after synthesis, respectively, in a second image sensing mode of the second embodiment.
Figure 4A:
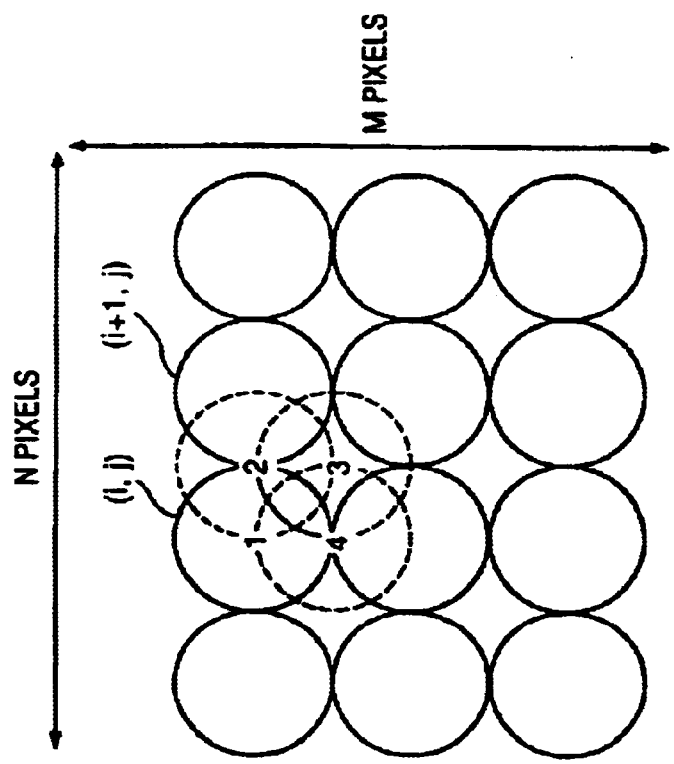

FIGS. 4A and 4B are plan views each showing, in a time series manner, a relative movement between the light-receiving portions of the image sensor 111 and an image of an object to be photographed. Note that in FIGS. 4A and 4B, it is assumed that an image of an object to be photographed is fixed, as in FIGS. 2A and 2B. In FIG. 4A, the light-receiving portions of the image sensor 111 are moved to seemingly overlap each other. Consequently, like in FIGS. 2A and 2B discussed earlier, an image with a doubled resolution in both the X and Y directions can be obtained as illustrated in FIG. 4B. In this case, if each overlapped portion between the light-receiving portions is ½ of the light-receiving portion, MTF (Modulation Transfer Function) is weakened. Consequently an aliasing distortion caused by the image sensor 111 is suppressed. This eliminates the need for an optical low pass filter consisting of a quartz crystal or the like, which is usually attached to the front surface of the image sensor 111 in order to remove any aliasing distortion.

Note that in the above first and second embodiments, in the second image sensing mode the relative positions of an image of an object and the image sensor 111 are not changed in accordance with vibration detection. Since the frequency of a camera shake is generally about 10 Hz, a control signal for vibration correction can be superposed on a control signal for increasing the number of pixels which is supplied by the pixel number controller 151. As a result, high-resolution images free from a blur can be obtained in the second image sensing mode.

Note also that in the first and second embodiments discussed above, the relative positions of an image of an object to be photographed and the light-receiving portions of the image sensor 111 are shifted by a ½ pixel pitch in the horizontal direction and/or the vertical direction. This pitch need only be 1/N (N is a natural number of 2 or larger) of the pixel pitch. In this case, N images of an object, of course, must be photographed.

3rd Embodiment

The third embodiment of the present invention will be described below.

Figure 5A:
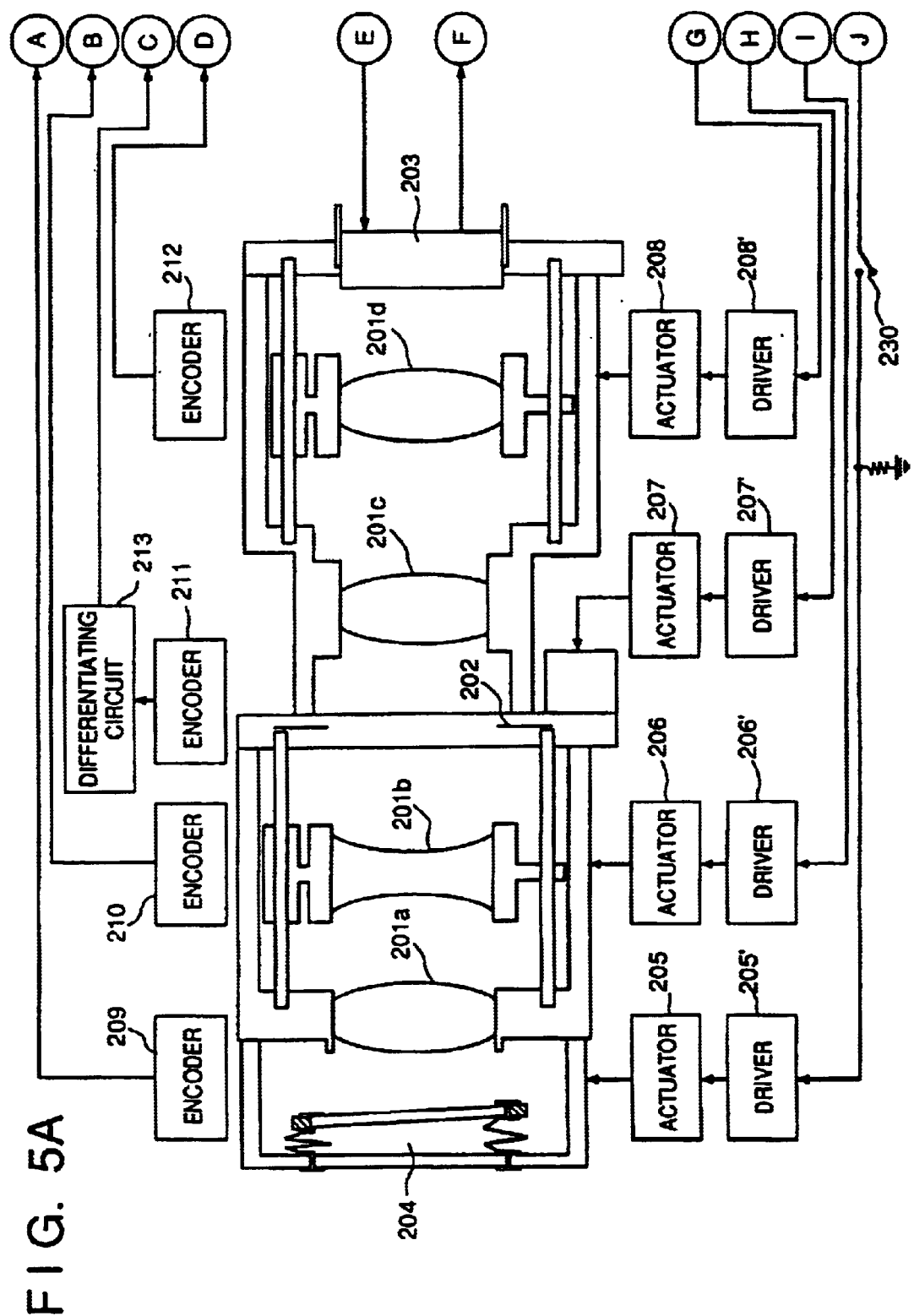
FIGS. 5A and 5B are block diagrams showing the arrangement of an image sensing apparatus according to the third embodiment of the present invention.
Figure 5B:
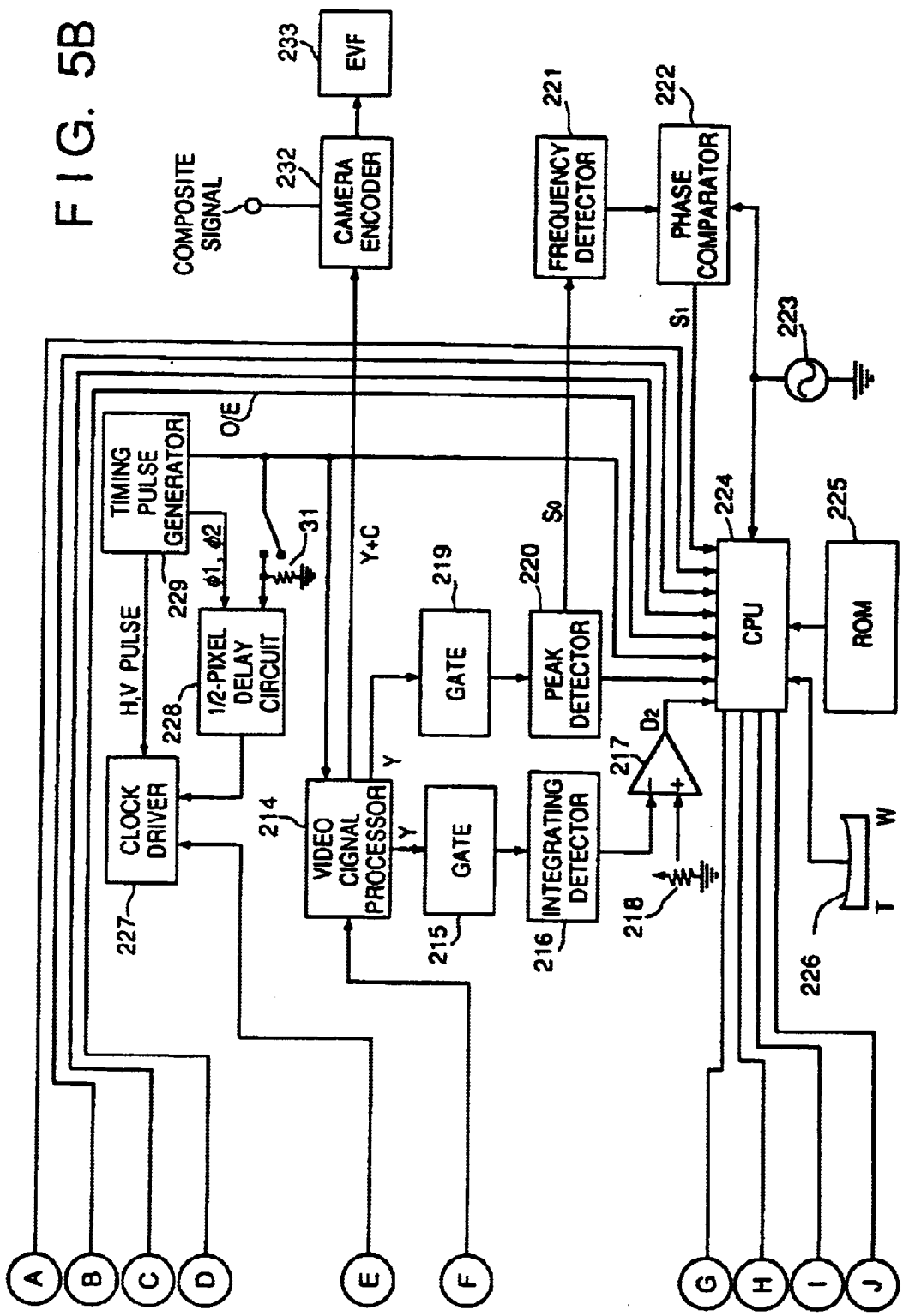

In this third embodiment, an image sensing apparatus including a zoom function will be described. FIGS. 5A and 5B show the arrangement of the image sensing apparatus according to the third embodiment. Reference numerals 201a to 201d denote zoom lens groups, in which 201b denotes a variator lens group for varying the magnification; and 201d, a focusing lens group. In FIGS. 5A and 5B, these zoom lens groups are constituted by lens groups having positive, negative, positive, and positive refracting powers. However, various arrangements are possible as an optical system having a variable magnification function or a focusing function. Therefore, the present invention is not limited to the arrangement shown in FIGS. 5A and 5B.

Reference numeral 202 denotes an aperture stop; and 203, an interline type CCD. The quantity of light entering the zoom lens groups 201 is adjusted by the aperture stop 202, and an image of the light is formed on the CCD 203. A VAP 204 refracts the light entering the zoom lens groups 201 and thereby can move the image formation position of the incident light on the CCD 203.

Actuators 205, 206, 207, and 208 drive their respective corresponding moving parts, i.e., the VAP 204, the variator lens group 201b, the aperture stop 202, and the focusing lens group 201d via drivers 205', 206', 207', and 208', respectively. Reference numerals 209 to 212 denote encoders. The encoder 209 outputs a vertical angle ø of the VAP 204 in the form of, e.g., a voltage. The encoders 210 and 212 output the absolute positions of the variator lens group 201b and the focusing lens group 201d, respectively, by voltages. The encoder 211 outputs the aperture amount of the aperture stop 202 and hence the Fno. (F-number) of the entire optical system by a voltage. These output values except the aperture value are supplied to a CPU 224 as a lens group control means. The aperture value is differentiated by a differentiating circuit 213 and supplied to the CPU 224.

An auto focus (AF) mechanism of the third embodiment will be described below. Note that in the third embodiment, the AF mechanism is described by taking so-called TV signal AF as an example, in which the focusing lens group is moved such that the frequency component of a luminance signal of a video signal becomes highest. However, the present invention can be similarly applied to ohter method, e.g., a TCL method or infrared AF.

An output video signal from the CCD 203 is passed through a video signal processor 214 and limited in region by a gate 219. A peak detector 220 detects a peak value of a luminance signal in a predetermined region and sends the peak value to the CPU 224 as information $S_0$ pertaining to the current focusing state. When an oscillator 223 supplies a driving signal of a constant period to the driver 208' via the CPU 224, the focusing lens group 201d is so driven as to finely oscillate in the optical axis direction. Consequently, the output $S_0$ from the peak detector 220 also oscillates in synchronism with the oscillation of the lens group. This state is shown in FIG. 6A.

Figure 6A:
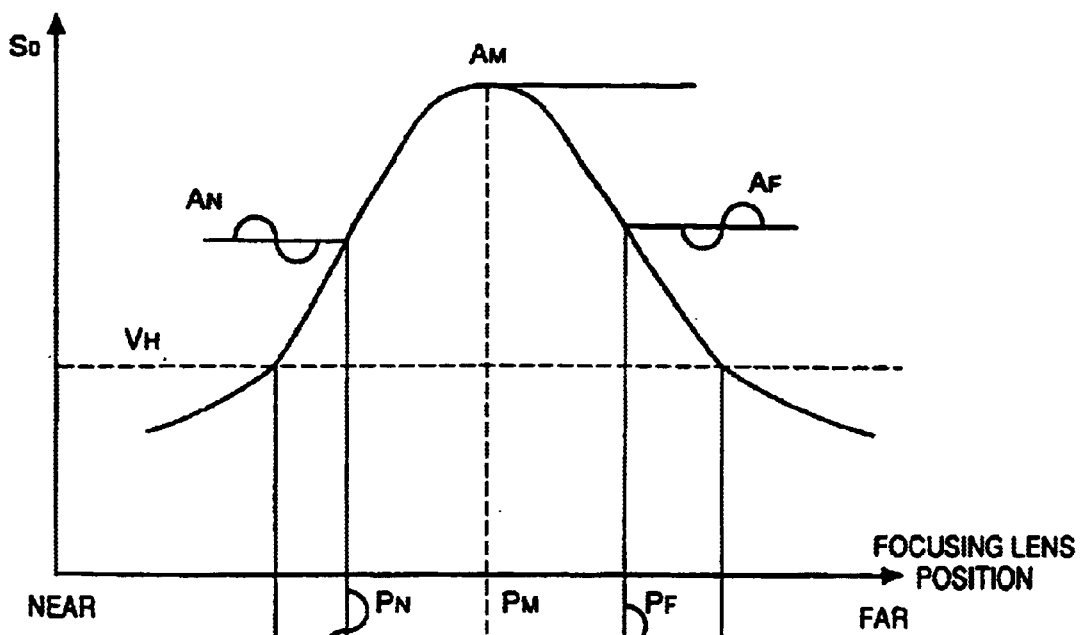
FIGS. 6A to 6C are views for explaining focus detection according to TV signal AF in the third embodiment.

In FIG. 6A, the output So from the peak detector 220 is plotted on the ordinate, and the position of the focusing lens group 201d is plotted on the abscissa. A position $P_M$ at which the peak value of $S_0$ is obtained is an in-focus position. Therefore, if the focusing lens group 201d finely oscillates in an out-of-focus state, e.g., when the focusing lens group 201d is located at $P_N$ or $P_F$, the phase of the output $S_0$ with respect to the direction of displacement of the focusing lens group 201d is shifted 180° in accordance with whether the focusing lens group 201d is positioned on the near distance side ($P_N$ side) or on the far distance side ($P_F$ side), as indicated by amplitudes $A_N$ and $A_F$ of the output $S_0$ at their respective positions.

Near focus and far focus, therefore, can be determined by sending the output from the peak detector 220 to a phase comparator 222 via a frequency detector 221 and comparing the output with the phase of the reference signal from the oscillator 223. Amplitudes A of the output are $A_N$ and $A_F$ when the focusing lens group 201d is positioned on the near focus and the far focus sides, respectively, and $A_M=0$ in an in-focus state.

Figure 6B:
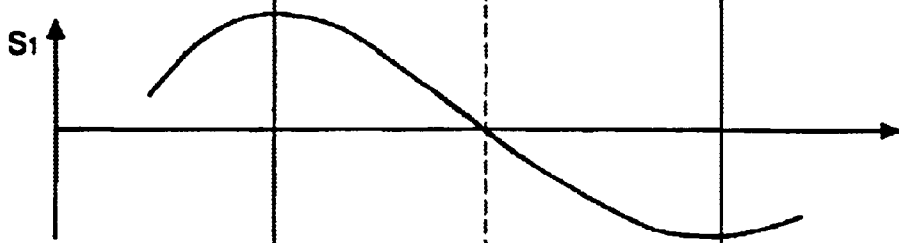

By performing synchronous detection for these signals using the output from the oscillator 223 as a reference timing, a signal $S_1$, FIG. 6B, is obtained. That is, assuming the signal in the near distance is in phase with the reference timing, a positive signal is output on the near distance side, and a negative signal is output on the far distance side, as the synchronous detection signal $S_1$. Note that if the circuit configuration is made such that the far distance signal is in phase with the reference signal, a negative signal is output on the near distance side, and a positive signal is output on the far distance side, as the synchronous detection signal $S_1$.

Figure 6C:
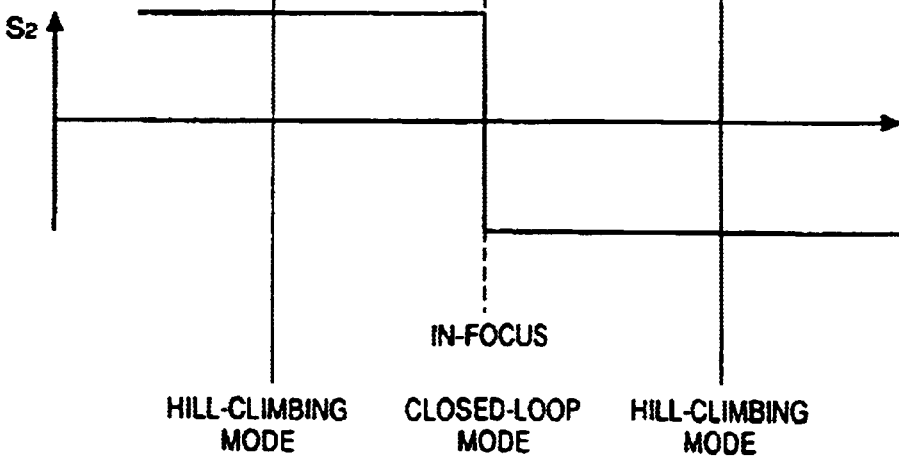

As discussed above, the value of the signal $S_1$ is "0" in an in-focus state, and its absolute value increases with the defocus amount. However, the signal $S_1$ decreases as the defocus amount increases. Therefore, if the signal $S_0$ becomes smaller than a reference level $V_H$, a signal to be used is not the signal $S_1$ but a signal $S_2$, FIG. 6C, obtained by comparing the signal $S_0$ generated when the focusing lens group 201d is located in the immediately preceding field with the signal $S_0$ generated at the current position of the lens group. Since the signal $S_2$ shown in FIG. 6C is the comparator output, this signal is equivalent to a direction signal which indicates the ascending portion or the descending portion of the peak shown in FIG. 6A. That is, the signal indicates the direction in which the lens group is to be driven with a given value either in the positive or negative direction from the in-focus position. More specifically, if the defocus amount is large ($S_0 < V_H$), the actuator 208 is driven at a fixed speed in accordance with the signal $S_2$ (a hill-climbing mode). If the defocus amount is near the in-focus position ($S_0 \geq V_H$), the actuator 208 is driven in accordance with the signal $S_1$ (a closed loop mode). Consequently, an in-focus state can be obtained in either case.

Of a series of operations discussed above, the fine oscillation of the focusing lens group 201d must be done in synchronism with driving of the CCD 203. The CPU 224 controls the operation such that the timing at which the video signal processor 214 receives the signal from the CCD 203 and the output timing of the oscillator 223 are synchronized with a field pulse signal O/E (O: odd field/E: even-field) generated by a timing pulse generator 229.

An operation of increasing resolution by using a pixel shift according to the third embodiment will be described below. In FIGS. 5A and 5B, reference numeral 227 denotes a clock driver for driving the CCD 203. A delay circuit 228 delays transfer pulse signals (ø1, ø2) from the timing pulse generator 229 by a ½ pixel in accordance with whether the field is an even-field or an odd field. A switch 231 is used to send field information to the delay circuit 228. The switch 231 is interlocked with a switch 230 for turning on and off a periodical pixel shifting operation. The switches 230 and 231 are turned on or off together. In performing the pixel shift, these switches 230 and 231 are turned on, and the delay circuit 228 checks whether the field pulse signal (O/E) from the timing pulse generator 229 indicates an even-field or an odd field. If the timing pulse signal is an even-field signal, the delay circuit 228 delays the transfer pulse signals (ø1, ø2) for a read horizontal shift register by a ½ pixel. If the timing pulse signal is an odd field signal, the delay circuit 228 sends the transfer pulse signals directly to the CCD driver 227 without delaying the signals. Alternatively, the delay circuit 228 delays the transfer pulse signals (ø1, ø2) for the read horizontal shift register by a ½ pixel if the field pulse signal is an odd field signal, and does not delay the transfer pulse signals if the field pulse signal is an even-field signal. The CCD 203 is driven in synchronism with the pulse signals (ø1, ø2) from the timing pulse generator 229. The VAP 204 is also driven such that the image formation position is horizontally shifted a ½ pixel on the image sensing plane for each field. Consequently, it is possible to obtain resolution equivalent to that obtained when the number of pixels in the horizontal direction is nearly doubled.

On the other hand, if the switches 230 and 231 are OFF, the field pulse signal (O/E) is not supplied to the delay circuit 228. Therefore, the transfer pulse signals (ø1, ø2) are constantly supplied to the CCD driver 227 after being delayed by a ½ pixel, and the periodical driving of the VAP 204 is stopped. That is, ON/OFF of the switches 230 and 231 corresponds to ON/OFF of the pixel shift mode.

When the switches 230 and 231 are ON, the timing the signal read out from the CCD 203 is shifted by a ½ pixel in accordance with whether the field is an odd field or an even-field. Therefore, by outputting this signal as a composite signal via a camera encoder 232, on the receiving apparatus side a high-resolution image can be obtained on, e.g., a high-resolution monitor from signals of both the fields.

Note that in FIGS. 5A and 5B, a user can visually check the output from the camera encoder 232 through an EVF (Electric View Finder) 233. The resolution of the EVF 233 can be relatively low when its performance is taken into account. However, in the high-resolution mode, i.e., when the switches 230 and 231 are ON, characters such as "HD" are superimposed on the display screen of the EVF 233. This allows a user to confirm in the low resolution EVF 233 that photographing is currently being done in the high-resolution mode.

Note that in the third embodiment, the read drive timing of the CCD 203 is shifted a ½ pixel in even and odd fields. However, it is also possible to write even-field signals in every other pixels of a memory having the number of horizontal pixels which is twice the number of pixels of the CCD 203, and to write odd field signals between the even-field signals. In this case the signals are sequentially read out pixel-by-pixel in the horizontal direction from the memory. Alternatively, a first field signal can be temporarily stored in a memory having the same number of pixels as that of the CCD 203. In this case, in reading out a second-field signal the signal from the memory and the output signal from the CCD 203 are alternately output pixel-by-pixel in the horizontal direction.

Automatic exposure control in the third embodiment will be described below.

In FIGS. 5A and 5B, an optical image of an object to be photographed taken by the taking lens groups 201a to 201d is formed on the image sensing plane of the CCD 203 after the light quantity of the image is adjusted by the aperture stop 202. The output video signal from the CCD 203 is limited in region by a gate 215 and subjected to integrating detection performed by an integrating detector 216. The resulting signal is output to an operational amplifier 217 as the intensity of luminance. The operational amplifier 217 compares this voltage value with the voltage of a reference voltage generator 218, amplifies the resultant difference signal, and outputs the signal to the CPU 224 as a difference signal $D_2$. The CPU 224 supplies a signal to the driver 207' such that this difference voltage becomes "0", thereby driving the aperture actuator 207. In order that the aperture stop 202 is opened/closed stably, the CPU 224 performs control such that a differential output $D_1$ indicative of the aperture position from the differentiating circuit 213 is fed back and so the level of $D_1$ is held at a predetermined value. With the above operation, exposure is automatically optimized in the third embodiment. Therefore, whether the automatic exposure control is completed can be determined by checking whether the output $D_1$ from the differentiating circuit 213 is close to "0" or whether the difference signal $D_2$ from the operational amplifier 217 is close to "0".

A zoom function in the third embodiment will be described below.

Referring to FIGS. 5A and 5B, when a zoom switch 226 is turned on a direction signal corresponding to the depressed direction (T side/W side) of the zoom switch 226 is supplied to the CPU 224. Note that the zoom switch 226 designates execution of close up photographing in a tele mode when depressed to the T side and execution of wide-angle photographing in a wide mode when depressed to the W side. Upon receiving the direction signal, the CPU 224 sends a signal to the driver 206' to move the variator lens group 201b in a predetermined direction. The optical system used in the 0, the CPU 224 moves the focusing lens group 201d toward the near distance side in step S16. The CPU 224 repeatedly executes this processing until $S_0 \leq V_H$ is obtained in step S13.

If $S_0 \leq V_H$ in step S13, the flow advances to step S17, and the CPU 224 checks whether $|S_1| > V_{S1}$. $V_{S1}$ is a predetermined value close to "0". If $|S_1| > V_{S1}$, the CPU 224 so drives the focusing lens group 201d that $|S_1|=0$ in step S18.

If $|S_1| \leq V_{S1}$ in step S17, the CPU 224 determines that an in-focus state is obtained. Therefore, in step S19 the CPU 224 stops the focusing lens group 201d.

Thereafter, the flow advances to step S20, and the CPU 224 checks whether $D_1 > V_{D1}$ is established for the differential output $D_1$ which is supplied from the differentiating circuit 213 and indicates the aperture position of the aperture stop 202. $V_{D1}$ is a predetermined value close to "0". If $D_1 > V_{D1}$, in step S21 the CPU 224 checks whether $D_2 > V_{D2}$ is established for the difference signal $D_2$ from the operational amplifier 217. $V_{D2}$ is also a predetermined value close to "0". If $D_2 > V_{D2}$, in step S22 the CPU 224 performs the automatic exposure control discussed above, and the flow advances to step S26.

If $D_1 \leq V_{D1}$ in step S20 or $D_2 \leq V_{D2}$ in step S21, the flow advances to step S23, and the CPU 224 checks third embodiment is a so-called variable focal lens group in which the focusing lens group 201d is closer to the image plane than the variator lens group 201b. Consequently, the in-focus plane moves with movement of the variator lens group 201b. Therefore, the CPU 224 drives the variator lens group 201b and at the same time must also drive the focusing lens group 201d on the basis of data from a ROM 225 in order to keep the in-focus state of the CCD 203. Note that if the optical system is not a variable focal lens group, the focusing lens group can be kept fixed. Whether the zoom operation is completed can be determined by checking ON/OFF of the signal from the zoom switch 226.

An $A_F$ operation performed by the CPU 224 will be described below with reference to FIG. 7.

Figure 7:
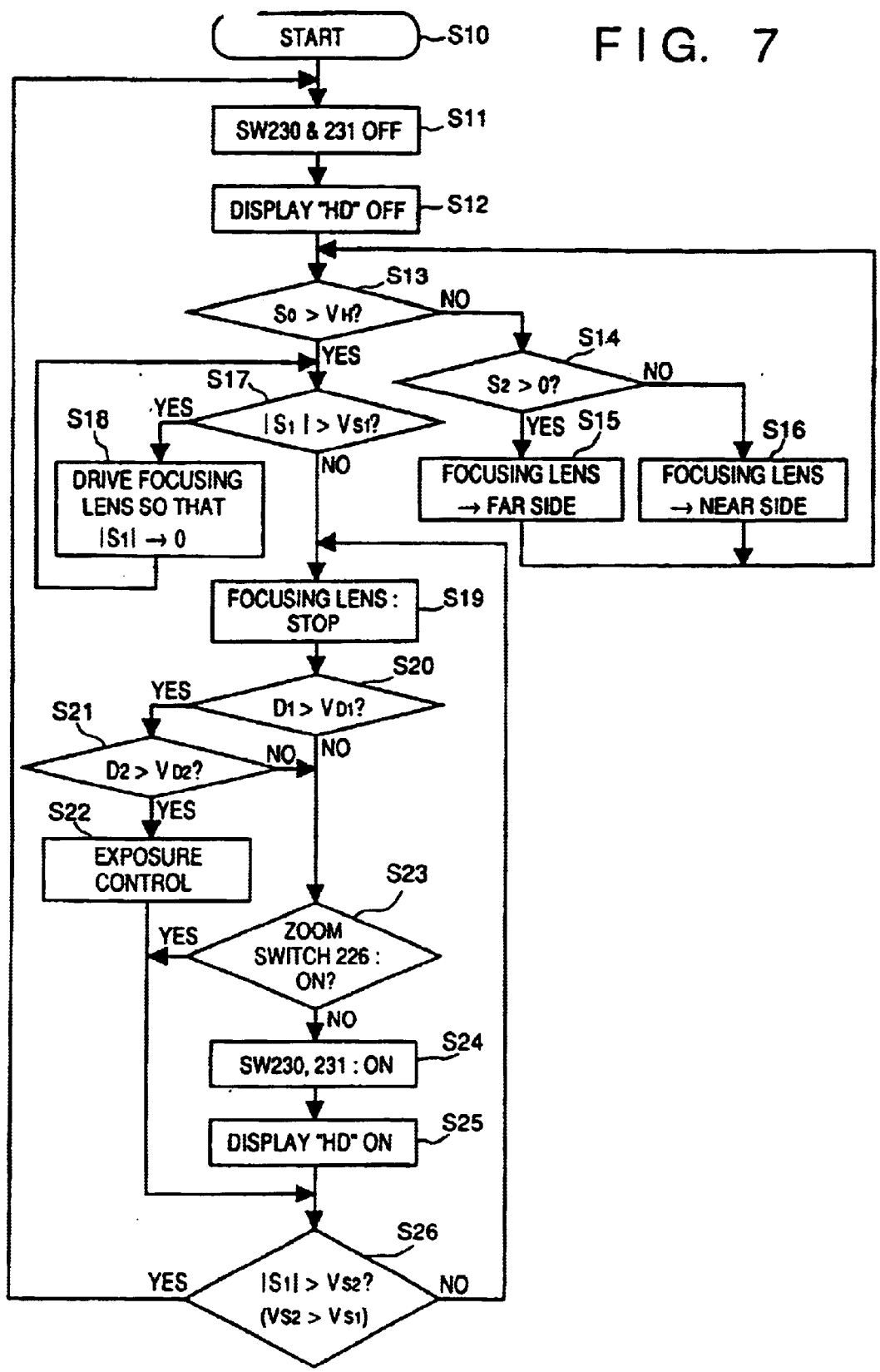
FIG. 7 is a flow chart showing pixel shift start determination processing in the third embodiment.

Referring to FIG. 7, in step S10 the CPU 224 starts the AF operation. Thereafter, the CPU 224 turns off the switches 230 and 231 in step S11 and also turns off the display of characters "HD" indicating the high-resolution mode from the image in the EVF 233 in step S12. In step S13, the CPU 224 checks whether $S_0 > V_H$ as described above in FIG. 6A. If $S_0 \leq V_H$, the flow advances to step S14 because the defocus amount is large. In step S14, the CPU 224 checks whether $S_2 > 0$. If $S_2 > 0$, the CPU 224 moves the focusing lens group 201d toward the far distance side in step S15. If $S_2 \leq$ whether the zoom switch 226 is ON, i.e., is depressed. If the zoom switch 226 is OFF, the flow advances to step S24, and the CPU 224 turns on the switches 230 and 231. In step S25, the CPU 224 superimposes the characters "HD" on the EVF 233. This display is not limited to "HD" but can be an icon or some other characters. If the zoom switch 226 is ON in step S23, the flow advances to step S26.

In step S26, the CPU 224 checks whether $|S_1| > V_{S2}$. $V_{S2}$ is a predetermined value meeting $V_{S2} > V_{S1}$. If $|S_1| > V_{S2}$ in step S26, the flow returns to step S11; otherwise, the flow returns to step S19. Since the relation $V_{S2} > V_{S1}$ is established in this manner, no hunting occurs in the AF processing even if the level of $S_1$ is unstable.

The AF processing is performed as described above. In the third embodiment, therefore, the switches 230 and 231 are turned on and the display "HD" is superimposed only when all of the three conditions, (1) $|S_1| < V_{S1}$, (2) $D_1 \leq V_{D1}$ or $D_2 \leq V_{D2}$, and (3) the switch 226 is OFF, are satisfied. That is, photographing is done in the high-resolution mode only when AF is near an in-focus state, exposure is nearly appropriate, and there is no zoom command. Therefore, in the third embodiment an unnecessary pixel shift is not performed in an out-of-focus state, when the entire image is black or white on the screen, or during zooming.

In the third embodiment, the pixel shift and the superimpose display are performed when all of the above conditions (1) to (3) are met, and so the method can be considered to be most efficient. However, the pixel shift and the superimpose display can also be done when one or two of the conditions (1) to (3) are met. Even in this case, a power-saving effect can be obtained to some extent.

According to the third embodiment as discussed above, whether the pixel shift is to be performed is determined in accordance with the input signal to the CPU for controlling the image sensing apparatus. This prevents interference between the pixel shift and other automatic adjusting functions of the image sensing apparatus. In addition, an unnecessary pixel shift is not performed in an out-of-focus state or when exposure is inadequate. This effectively saves the consumption power. Consequently, it is possible to constantly obtain high-resolution images with a high efficiency.

4th Embodiment

The fourth embodiment according to the present invention will be described below.

Figure 8:
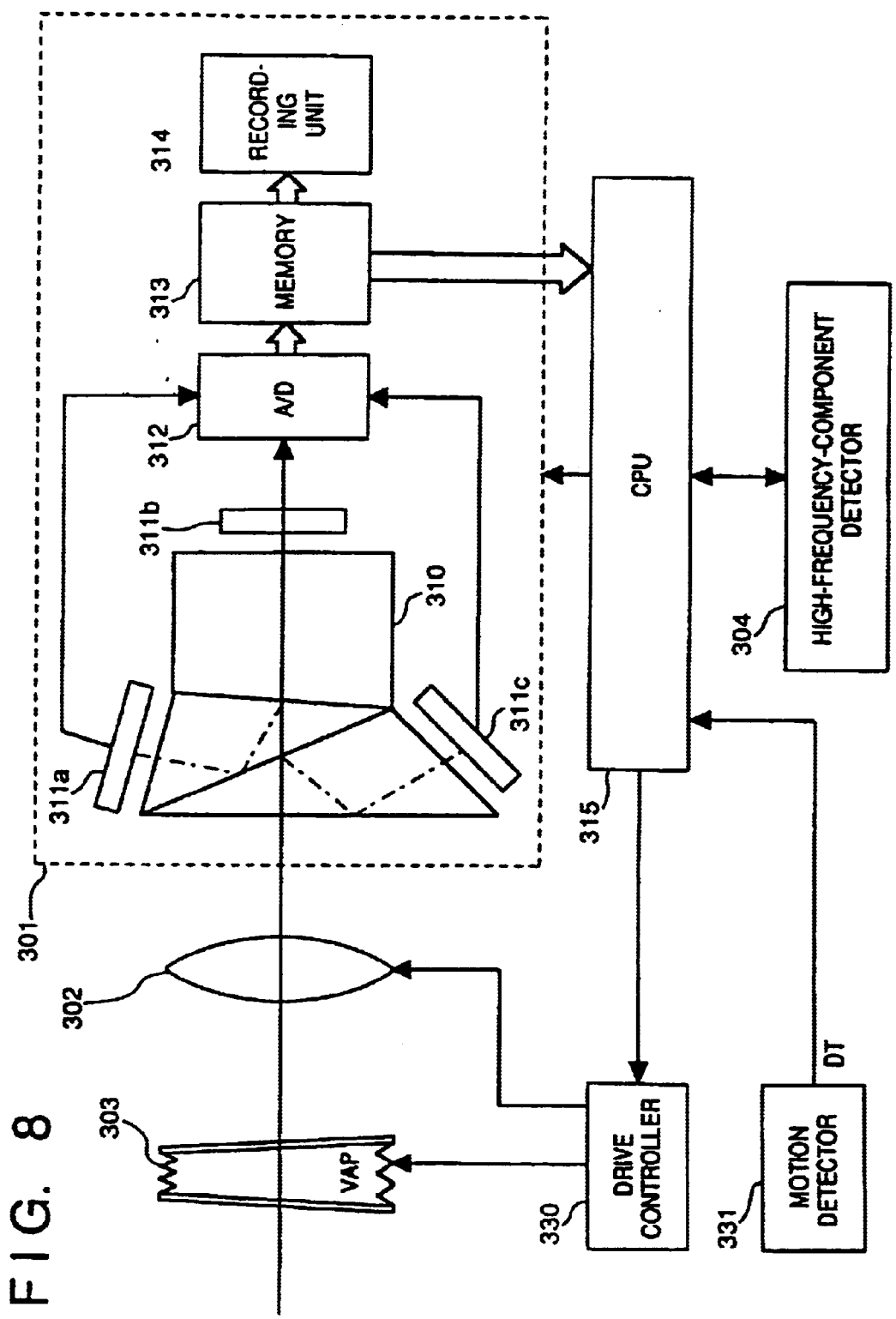
FIG. 8 is a block diagram showing the arrangement of an image sensing apparatus according to the fourth embodiment of the present invention.

FIG. 8 is a block diagram showing the arrangement of an image sensing apparatus of the fourth embodiment. plates such as glass plates. The optical performance of a transmitted light beam is arbitrarily changed by changing the angles of these parallel plates using an external biasing force. Examples of the transparent elastic body sandwiched between the parallel plates are water, alcohol, glycol, silicone oil, silicone gel, silicone rubber, and organic oil.

A motion detector 331 detects the amount of a camera shake in real time by using an acceleration sensor. In accordance with the detected amount, the front and rear glass plates of the VAP 303 are moved by a driving mechanism (not shown), thereby changing the vertical angle of the VAP 303. In this manner, a blur of an image caused by the camera shake is corrected. A drive controller 330 performs drive control, such as focus detection and exposure of the image sensing system 302, and drive control of the driving mechanism for the glass plates of the VAP 303. The drive timing of the drive controller 330 is controlled by the CPU 315.

A high-frequency component detector 304 extracts a high-frequency component from data in a predetermined area of the memory 313. The CPU 315 and the drive controller 330 keep driving the image sensing system 302 until the high-frequency component is maximized, i.e., an in-focus state is obtained. The focus detection method in the fourth embodiment is a so-called "hill-climbing servo method" which is well-known in the field of a video camera and in which an image sensing optical system is so controlled that a high-frequency component of an output signal from a CCD is maximized. This method is disclosed in Ishida et al., "Automatic Focus Adjustment of Television Camera According to Hill-climbing Servo Method", NHK Technology, Vol. 17, No. 1, and so a detailed description thereof will be omitted.

Figure 9:
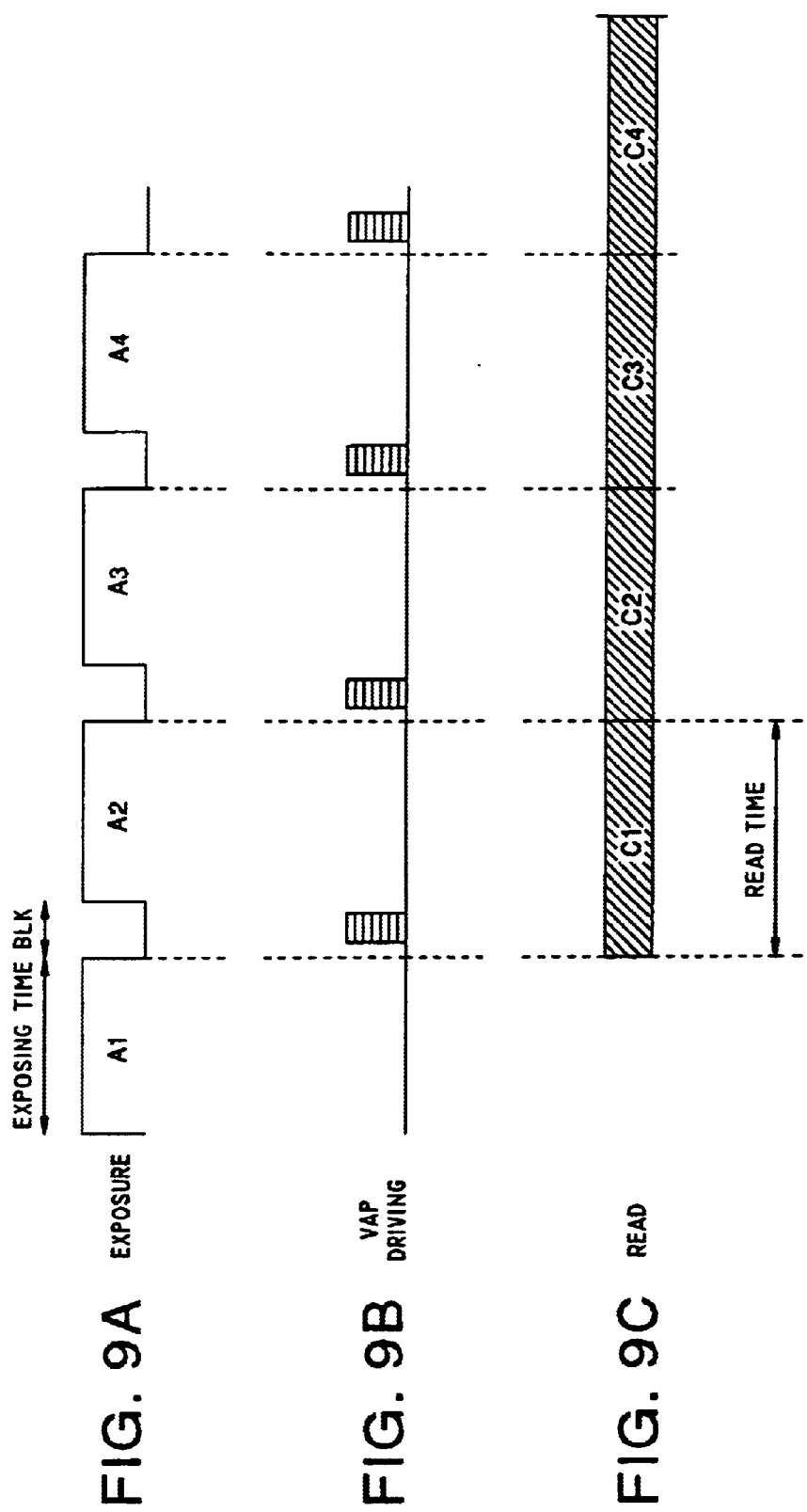
FIG. 9 is a timing chart of CCD driving in the fourth embodiment.

In the fourth embodiment, a pixel shift is performed by changing the relative position of an image of an object with respect to each CCD by further slightly changing the vertical angle of the VAP 303. If the image sensing apparatus vibrates during photographing, the influence of the vibration can be reduced by superposing the driving of the pixel shift on the driving of the VAP 303 for vibration isolation. FIG. 9 is a timing chart showing the state in which signals exposed and stored in the CCDs are sequentially read out while the VAP 303 is performing the pixel shift. Since the operations of the CCDs 311a to 311c are exactly the same, the operation of the CCD 311b will be described as an example.

Referring to FIG. 9, A1 represents the first exposure, and the read of a signal stored by the exposure A1 is represented by C1. That is, after the exposure A1 is completed, the read C1 of the stored signal is started, and at the same time the VAP 303 is driven to perform a pixel shift. Likewise, signals stored in exposures A2, A3, and A4 are read out in C2, C3, and C4, respectively. After each of the exposures A2, A3, and A4 is completed, the VAP 303 is driven to perform a pixel shift.

Figure 10:
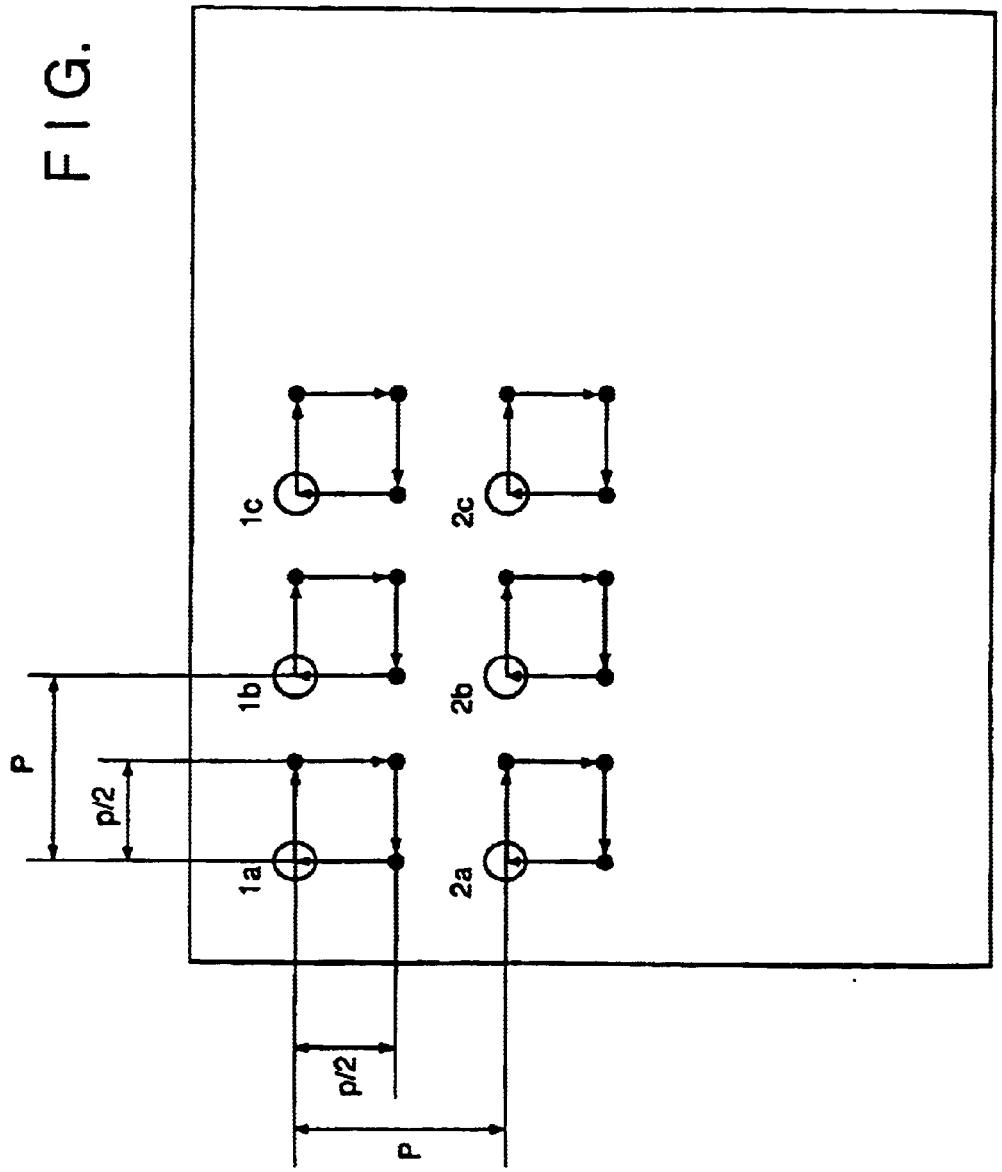
FIG. 10 is a view showing the way the position of an image of an object to be photographed is shifted on an image sensor in the fourth embodiment.

The pixel shift in the fourth embodiment will be described below. FIG. 10 shows the way the position of an image of an object to be photographed is shifted on the CCD by the VAP 303. Reference symbols 1a, 1b, 1c, 2a, 2b, and 2c denote some pixels on the CCD 311b; and p, a pixel pitch. In the fourth embodiment, it is assumed that the pixel pitches are identical in the vertical and horizontal directions. Note that since the pixel arrangements of the CCDs 311a and 311c are identical with that of the CCD 311b, only the CCD 311b will be described below.

After an image of an object is photographed once at the initial position, the VAP 303 is driven such that images of the object projected on the pixels 1a, 1b, 1c, 2a, 2b, and 2c are shifted by a p/2 pitch to the right in FIG. 10. Thereafter, photographing is executed again. The driving amount at this time is calculated as follows.

For the simplicity of explanation, the positional relationship between the VAP 303 and the image sensing Reference numeral 301 denotes a recording system including CCDs. A trichromatic separation prism 310 separates light from an object to be photographed into three colors, red (R), green (G), and blue (B), and supplies these three light components to three CCDs 311a to 311c. R, G, and B filters are adhered to the CCDs 311a, 311b, and 311c, respectively. In the fourth embodiment, the pixel arrangements in the three CCDs 311a to 311c are precisely identical. That is, no pixel shift is done between the CCDS, so an image of an object to be photographed is projected at the same position in each CCD. Reference numeral 312 denotes an A/D converter for converting outputs from the CCDs 311a to 311c into digital signals; and 313, a memory. The RGB image data obtained by the CCDs 311a to 311c are recorded in a recording unit 314, such as a semiconductor memory card or a hard disk, via the A/D converter 312 and the memory 313. This recording operation is controlled by a CPU 315.

Figure 11:
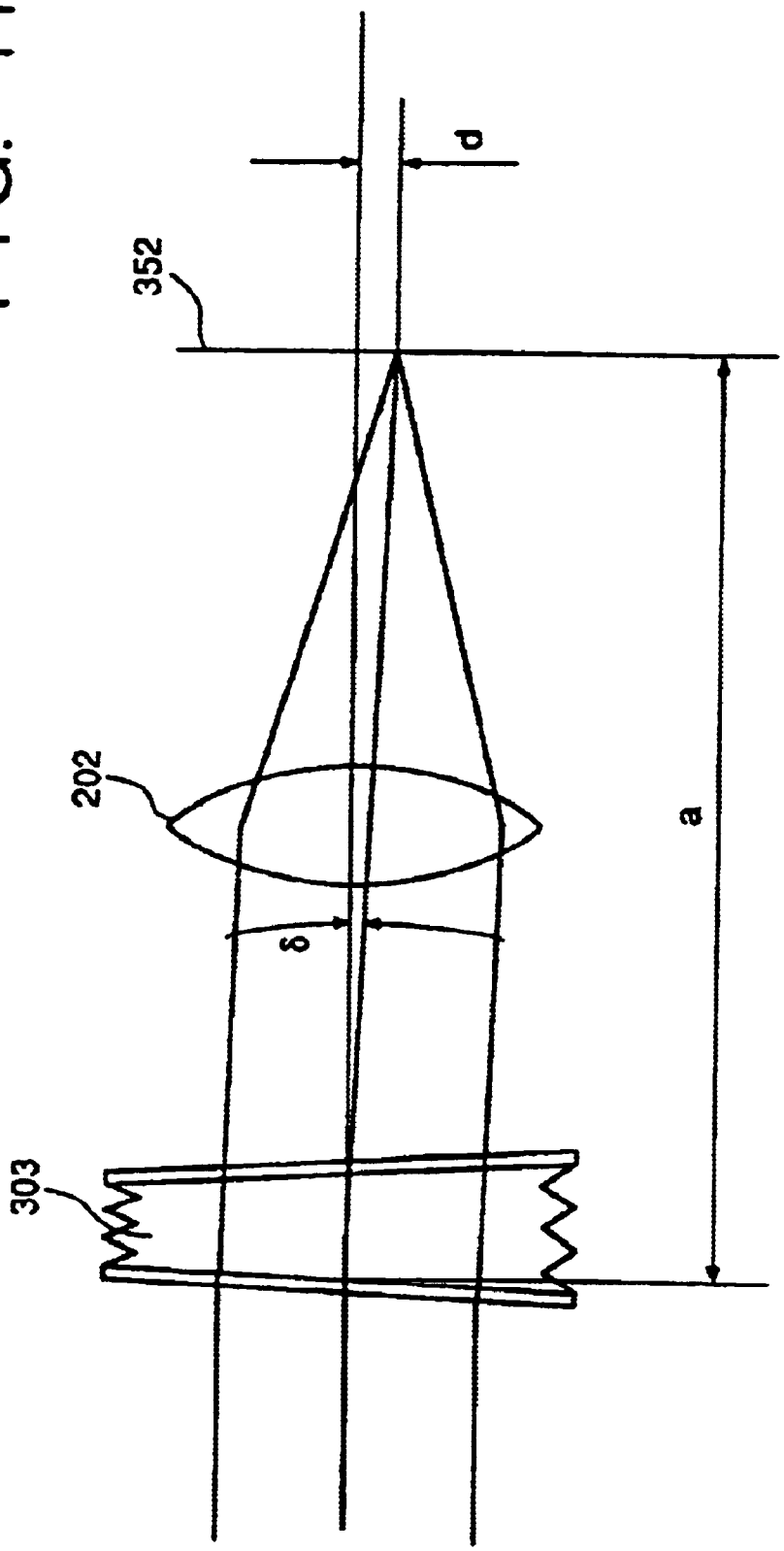
FIG. 11 is a view showing the relationship between the inclined angle of a light beam and the shifted amount of an image of an object in the fourth embodiment.

An image sensing system 302 controls exposure, focus detection, zooming, and the like processing. A VAP 303 is a pixel shifting means for changing the relative position of an image of an object with respect to each CCD. As explained in Japanese Patent Laid-Open No. 2-124518, the VAP 303 is an optical element formed by sealing a transparent elastic body between parallel system 302 is extracted from FIG. 8 and illustrated in FIG. 11. In FIG. 11, symbols have the following meanings.

δ: The angle at which light rays are inclined by the VAP 303.

a: The distance from the VAP 303 to an image pick up plane 352.

d: The shift amount (pixel shift amount) of an image of an object on the image sensing plane 352.

In this case, since d is sufficiently small, the following equation is established:

tanδ=d/a

Since a >>d, δ=d/a is established.

In order for the pixel shift amount d to be p/2, therefore, it is only necessary to drive the VAP 303 until the inclination angle δ, with which δ=d/a=p/2a is established, is obtained. Generally, control of the VAP 303 is done by the angle defined between the front and rear glass plates constituting the VAP 303, i.e., the vertical angle, rather than by the inclination angle δ of light rays. Calculations for this control will be discussed in detail in the fifth embodiment to be described later.

In FIG. 10, the images of the object are photographed as they are shifted in units of p/2 downward and to the left in the same manner as mentioned above. Thereafter, the images are returned to the initial positions. The data obtained by projecting colors R, G, and B while the object images are shifted four times in this way are rearranged in the memory 313. This makes it possible to reconstruct, for each of R, G, and B, a high-resolution image having the number of pixels which is four times the number of pixels of each CCD.

The high-frequency component detector 304 detects a high-frequency component from the images obtained as discussed above, e.g., from an image of G component, thereby performing focus detection. Since the pixel shift is done for the image information to be detected, the information amount is doubled in each of the vertical and horizontal directions. Therefore, a larger amount of a high-frequency component is extracted than before the pixel shift is performed. The image sensing system 302 is kept driven until the high-frequency component is maximized, i.e., an in-focus state is obtained.

According to the fourth embodiment as discussed above, the image sensing apparatus includes the means for photographing an image of an object to be photographed by using n (n is 2 or larger) image sensors, and the means for exposing the image of the object a plurality oF-number of times while changing the relative position of the image to each image sensor. As a result, it is possible to obtain high-resolution images. This makes detection of a larger amount of a high-frequency component and therefore a more accurate focus detection feasible.

5th Embodiment

The fifth embodiment of the present invention will be described below.

An image sensing apparatus of the fifth embodiment has an arrangement identical with that of the fourth embodiment shown in FIG. 8, so a detailed description thereof will be omitted. In the fifth embodiment, of the three CCDs 311a to 311c illustrated in FIG. 8, the CCDs 311a and 311b have a filter of G, and a pixel shift is done between them. Note that the CCD 311c has stripe filters of R and B. The arrangement of the fifth embodiment is similar to that disclosed in "Highvision ⅔-inch compact CCD camera using dual green method" in Television Society Magazine, "Image Information Engineering and Broadcasting Technology", Vol. 47, No. 2, 1993 described in "BACKGROUND OF THE INVENTION". Also, a method of producing RGB signals for all pixels from photographed data is known to those skilled in the art. Therefore, a method of a pixel shift with respect to a luminance signal of an image of an object to be photographed will be described below.

Figure 12:
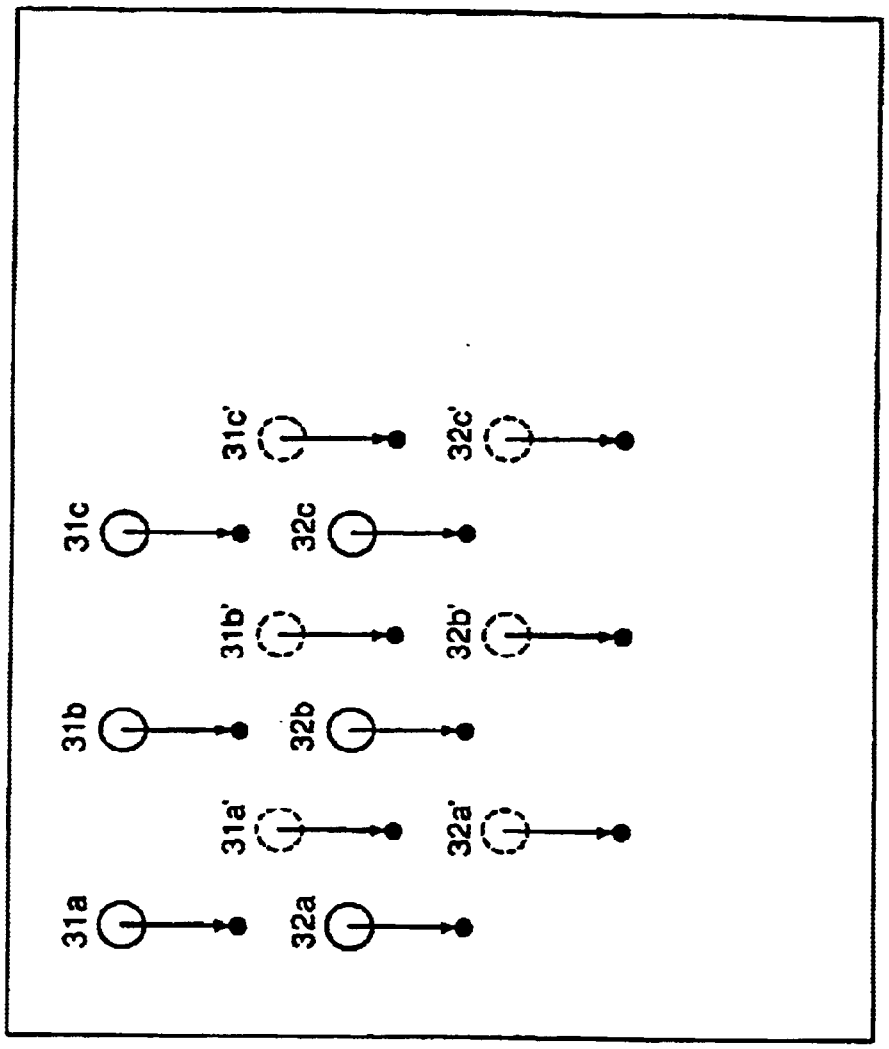
FIG. 12 is a view showing the way an image is shifted in the fifth embodiment of the present invention.

Referring to FIG. 12, reference symbols 31a, 31b, 31c, 32a, 32b, and 32c denote some pixels in the CCD 311a. In the CCD 311b, on the other hand, pixels are arranged at positions corresponding to positions between the pixels in the CCD 311a, i.e., arranged at pixel-shifted positions, as indicated by 31a', 31b', 31c', 32a', 32b', and 32c'. After photographing is performed in this state, the relative positions of images of an object to be photographed are shifted in the direction indicated by arrows in FIG. 12 by a VAP 303, and again photographing is performed. In this method, a pixel arrangement of a G component as a luminance component is originally shifted. Therefore, for a luminance component it is possible to obtain the number of pixels which is equivalent to the number of pixels in the RGB three sensor method described in the fourth embodiment by performing photographing a total of two times.

Note that in the fifth embodiment, in two of the three CCDs the pixel shift is done in both the horizontal and vertical directions. However, the pixel shift can also be performed only in one direction.

In addition, if n ($2 \leq n$) CCDs are employed and m ($2 \leq m \leq n$) CCDs having filters of the same color are pixel-shifted by 1/m each in the horizontal or vertical direction, ((k+1)×m) pixel data can be obtained for a luminance component by pixel shifting an image of an object to be photographed to a position at which no pixel is present k times by using a VAP or the like. These data are rearranged in a memory 313. This makes it possible to reconstruct, for a luminance component, a high-resolution image having a data amount (k+1) times as large as the data amount of each CCD.

According to the fifth embodiment as discussed above, it is possible to synthesize images with the same high-resolution as in the fourth embodiment within a shorter time than in the fourth embodiment.

6th Embodiment

The sixth embodiment according to the present invention will be described below.

Conventionally, a method has been proposed by which an image of an object to be photographed is divided into a plurality of regions and photographed, and the photographed images are synthesized to obtain a high-resolution image. The sixth embodiment is characterized by further increasing the resolution in this method.

Figure 13:
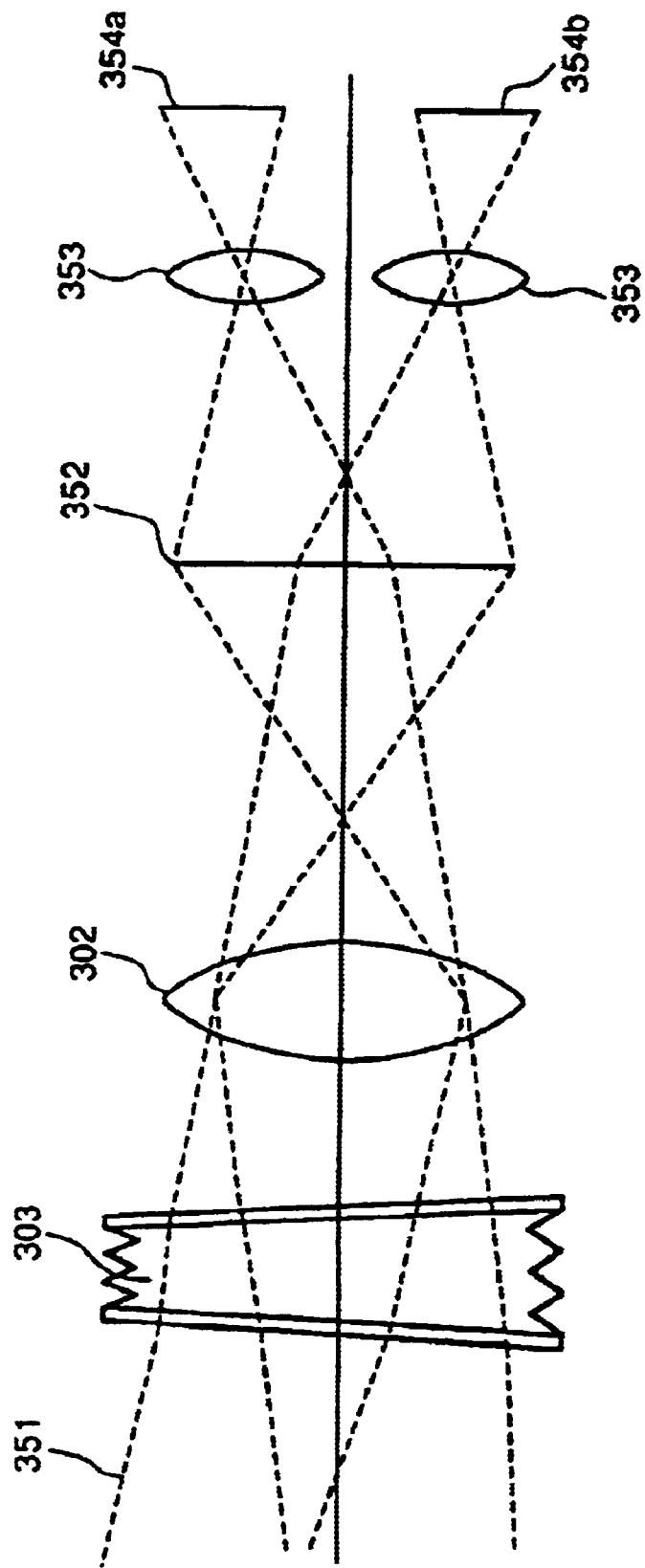
FIG. 13 is a block diagram showing the arrangement of the sixth embodiment of the present invention.

The arrangement of an image sensing apparatus of the sixth embodiment is nearly identical with that of the fourth embodiment shown in FIG. 8 except that an optical system for forming an image of an object to be photographed on each CCD is different from that of the fourth embodiment. FIG. 13 shows an optical system in the sixth embodiment, in which the same reference numerals as in FIG. 8 denote the same parts and a detailed description thereof will be omitted.

Referring to FIG. 13, dotted lines 351 represent a light beam from an object to be photographed. An image of the beam 351 is first formed on a primary image formation plane 352 via a VAP 303 and an image sensing system 302. The image of the object once formed on the primary image formation plane 352 is divided by a secondary image formation optical system 353 and formed as secondary images on CCDs 354a and 354b. In this case the object images formed as the secondary images on the CCDs 354a and 354b are essentially pixel-shifted by the VAP 303. The images formed on the two CCDs 354a and 354b are syn-thesized in a memory 313 to yield an image having the number of pixels which is twice the number of pixels of one CCD.

According to the sixth embodiment as discussed above, images with a higher resolution can be photographed.

In addition, in the sixth embodiment a still higher resolution can be achieved by periodically driving the VAP 303 and further performing a pixel shift as illustrated in FIG. 9 of the fourth embodiment, thereby performing photographing a plurality of times.

In each of the first to sixth embodiments described above, a VAP is used as the pixel shifting means. However, the present invention is not limited to these embodiments and can be realized by using the following means as well. FIGS. 14A to 14E illustrate means for changing the relative position of an image of an object to be photographed with respect to a CCD, i.e., pixel shifting means, including a VAP used in the above embodiments.

Figure 14C:
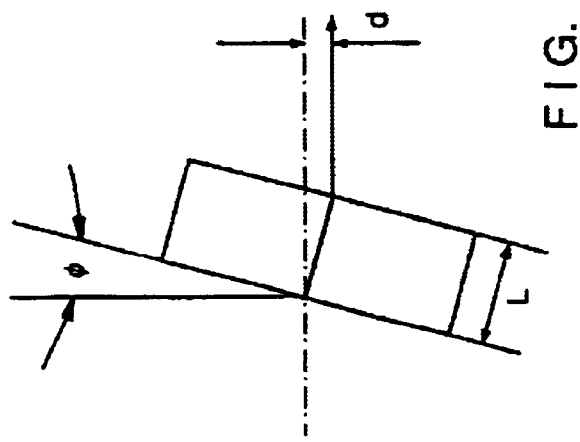
FIGS. 14A to 14E are views showing other means for performing a pixel shift in the first to sixth embodiments.
Figure 14E:
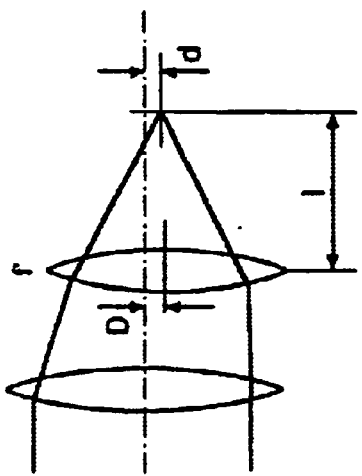
Figure 14B:
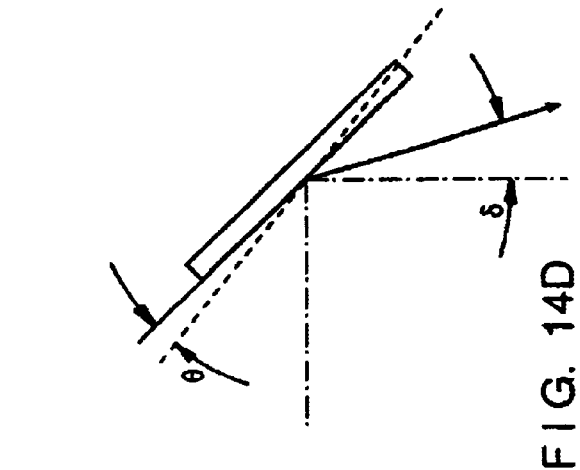
Figure 14A:
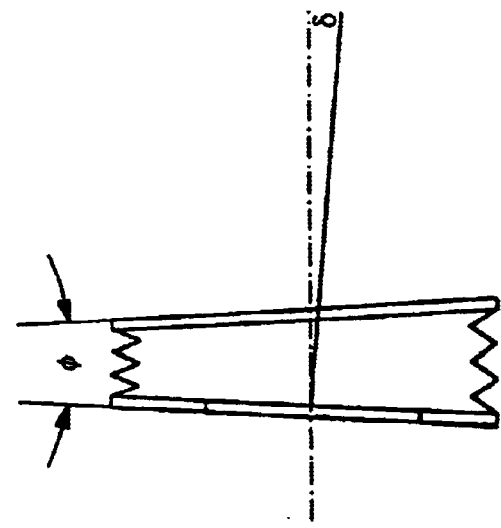

FIG. 14A shows the VAP method discussed above. Assuming that the vertical angle is ø, the inclination angle of a light beam is d, and the refractive index of a VAP is n, $\delta \cong (n-1) \times \phi$ is established.

FIG. 14B shows a reflection argument method. When a mirror surface reflecting plate is inclined by θ, $\delta = 2 \times \theta$ is established for an inclination angle δ of a light beam. Note that in the pixel shifting methods in FIGS. 14A and 14B, ø and θ are controlled by performing calculations such that an image of an object to be photographed is shifted a predetermined amount on an image sensing plane.

FIG. 14C shows a rotary prism method. When a prism with a width L is inclined by ø, a light beam is shifted parallel by d which is given by $d = ((n-1) \times L \times \phi)/n$.

Figure 14D:
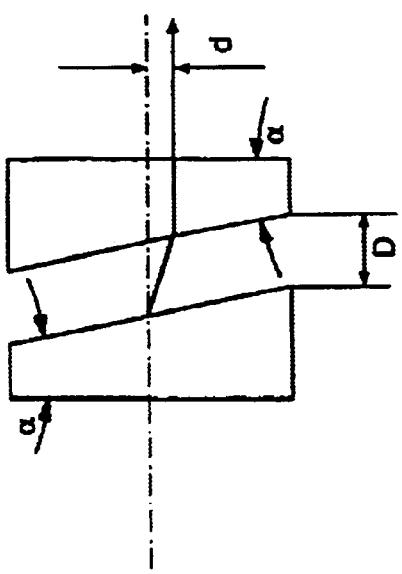

FIG. 14D illustrates a moving prism method. When two prisms each having a vertical angle α and a refractive index n are arranged in the reverse directions as in FIG. 14D, the relationship between a distance D between the prisms and a distance d by which a light beam is shifted is given by $d \cong (n-1) \times \alpha \times D$. Therefore, an image can be shifted by changing D. In the pixel shifting methods illustrated in FIGS. 14C and 14D, (pixel shift amount)=d when the prism or the prisms are arranged immediately before the CCD. If another optical system is inserted between the prism or the prisms and the CCD, the driving amount d need only be determined by taking account of the effect of that optical system.

FIG. 14E illustrates a moving lens group method. A lens group with a focal length f' arranged in a taking lens group system is vertically shifted by D with respect to the optical axis. Assuming the distance between the lens group and the in-focus plane is 1, a shifted amount d of an image on the in-focus plane is represented by $d \cong 1 \times D/f'$.

As discussed above, the VAP method, FIG. 14A, as explained in the fifth embodiment is merely one example of the pixel shifting methods, so the means of dynamically shifting pixels can be achieved by various methods.

Among other methods by which similar effects can be obtained are a method as disclosed in Japanese Patent Publication No. 57-31701, in which a polarizer capable of controlling the direction of polarized light is arranged in an optical path; a method as disclosed in Japanese Patent Laid-Open No. 3-201883, in which an entire image sensing apparatus is displaced; a method in which an image is obtained by displacing an image sensing optical system either partially or entirely to change the relative positional relationship between the image formed by an input optical system and a light-receiving portion of a CCD with time;

and a method in which a CCD itself is vibrated on a plane normal to the optical axis by using a piezoelectric element or the like.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:

image forming means for forming an image of an object to be photographed;

image sensing means for photographing the image of the object formed by said image forming means;

displacing means for displacing the image of the object formed by said image forming means and said image sensing means relative to each other; and control means for performing switching between a first image sensing mode in which said displacing means performs a vibration correction to yield a low resolution image and a second image sensing mode in which said displacing means performs a pixel shift to yield a high-resolution image.

2. The apparatus according to claim 1, wherein said image sensing means includes a plurality of image sensors each corresponding to one pixel, and in the second image sensing mode the image of the object is shifted by 1/N (N is a natural number of not less than 2) of a pixel pitch of said image sensing means by said displacing means, and resulting N images of the object are photographed and synethesized to yield a high-resolution image.

3. The apparatus according to claim 2, further comprising a memory for synthesizing the N images of the object obtained in the second image sensing mode.

4. The apparatus according to claim 2, further comprising vibration detecting means for detecting a vibration of said image sensing apparatus, wherein in the first image sensing mode said displacing means is controlled in accordance with an amount of the vibration detected by said vibration detecting means.

5. The apparatus according to claim 1, further comprising motion detecting means for detecting a motion vector of the object, wherein said control means performs switching between the first and second image sensing modes in accordance with information on the motion vector of the object detected by said motion detecting means.

6. The apparatus according to claim 1, wherein said displacing means includes a variable angle prism and an actuator for controlling a vertical angle of said variable angle prism.

7. The apparatus according to claim 2, wherein said image sensor is a CCD.

8. The apparatus according to claim 1, wherein said displacing means changes an argument of a mirror surface reflecting plate.

9. The apparatus according to claim 1, wherein said displacing means rotates a prism.

10. The apparatus according to claim 1, wherein said displacing means changes relative positions of a plurality of prisms.

11. The apparatus according to claim 1, wherein said displacing means changes a position of a lens group with respect to an optical axis.

12. An image sensing apparatus comprising:

image forming means for forming an image of an object to be photographed;

image sensing means for photographing the image of the object formed by said image forming means;

displacing means for displacing the image of the object formed by said image forming means and said image sensing means relative to each other;

synthesizing means for obtaining a high-resolution image by synthesizing a plurality of images of the object obtained by performing a pixel shift by said displacing means;

control means for performing switching between a first image sensing mode in which said displacing means performs a vibration correction to yield a low resolution image and a second image sensing mode in which said displacing means performs a pixel shift to yield a high-resolution image; and vibration correcting means for selectively performing a vibration correction by using said displacing means.

13. The apparatus according to claim 12, wherein said image sensing means includes a plurality of image sensors each corresponding to one pixel, said displacing means displaces the image of the object by 1/N (N is a natural number of not less than 2) of a pixel pitch of said image sensing means, and said synthesizing means synthesizes resulting N images of the object to yield a high-resolution image.

14. The apparatus according to claim 13, wherein said image forming means separates the image of the object to form a plurality of images, the same number of said image sensing means as the number of the images formed by said image forming means are provided, and in at least two of said plurality of image sensing means arrangements of image sensors are pixel-shifted from each other.

15. The apparatus according to claim 12, wherein said image forming means forms at least two secondary images of the object, said displacing means displaces the at least two secondary images relative to each other, and said image sensing means photographs the at least two secondary images.

16. The apparatus according to claim 12, wherein said displacing means includes a variable angle prism and an actuator for controlling a vertical angle of said variable angle prism.

17. The apparatus according to claim 12, wherein said displacing means changes an argument of a mirror surface reflecting plate.

18. The apparatus according to claim 12, wherein said displacing means rotates a prism.

19. The apparatus according to claim 12, wherein said displacing means changes relative positions of a plurality of prisms.

20. The apparatus according to claim 12, wherein said displacing means changes a position of a lens group with respect to an optical axis.

21. An image sensing apparatus comprising:

an image forming device which forms an image of an object;

an image sensing device which senses the image formed by said image forming device;

an adjusting circuit which adjusts a sensing condition;

a displacing circuit which displaces said image sensing device and the image formed by said image forming device relative to each other;

a synthesizing circuit which obtains an image by synthesizing a plurality of images of the object sensed by said image sensing device based on the displacing by said displacing circuit;

a determination circuit which determines whether or not said adjusting circuit has adjusted the sensing condition; and a control circuit which starts the displacing by said displacing circuit after said determination circuit determined that said adjusting unit has adjusted the sensing condition.

22. The apparatus according to claim 21,
wherein said synthesizing circuit synthesizes said plurality of images to yield a high-resolution image.

23. An image sensing apparatus comprising:

an image forming device which forms an image of an object;

an image sensing device which senses the image formed by said image forming device;

a displacing circuit which displaces said image sensing device and the image formed by said image forming device relative to each other;

a synthesizing circuit which obtains an image by synthesizing a plurality of images of the object sensed by said image sensing device based on the displacing by said displacing circuit;

a lens, wherein the image of the object is input to the image sensing device through the lens;

an adjusting circuit which adjusts a position of the lens to obtain an optimum focus state;

a determination circuit which determines whether or not said adjusting circuit has adjusted the position of the lens; and a control circuit which starts the displacing by said displacing circuit after said determination circuit determined that said adjusting circuit has adjusted the position of the lens.

24. The apparatus according to claim 23,
wherein said synthesizing circuit synthesizes said plurality of images to yield a high-resolution image.

25. An image sensing apparatus comprising:

an image forming device which forms an image of an object;

an image sensing device which senses the image formed by said image forming device;

a displacing circuit which displaces said image sensing device and the image formed by said image forming device relative to each other;

a synthesizing circuit which obtains an image by synthesizing a plurality of images of the object sensed by said image sensing device based on the displacing by said displacing circuit;

an aperture stop, wherein the image of the object is input to the image sensing device through the aperture stop;

an adjusting circuit which adjusts an aperture position of the aperture stop to obtain an optimum exposure;

a determination circuit which determines whether or not said adjusting circuit has adjusted the aperture position; and a control circuit which starts the displacing by said displacing circuit after said determination circuit determined that said adjusting circuit has adjusted the aperture position.

26. The apparatus according to claim 25,
wherein said synthesizing circuit synthesizes said plurality of images to yield a high-resolution image.

27. An image sensing apparatus comprising:

an image forming device which forms an image of an object;

an image sensing device which senses the image formed by said image forming device;

a displacing circuit which displaces said image sensing device and the image formed by said image forming device relative to each other;

a synthesizing circuit which obtains an image by synthesizing a plurality of images of the object sensed by said image sensing device based on the displacing by said displacing circuit;

a lens, wherein the image of the object is input to the image sensing device through the lens;

an adjusting circuit which adjusts a position of the lens to control a photographing magnification of the image of the object;

a determination circuit which determines whether or not said adjusting circuit is in action; and a control circuit which starts the displacing by said displacing circuit after said determination circuit determined that said adjusting circuit is not working.

28. The apparatus according to claim 27,
wherein said synthesizing circuit synthesizes said plurality of images to yield a high-resolution image.

* * * * *

UNITED STATES PATENT AND TRADEMARK OFFICE
CERTIFICATE OF CORRECTION

PATENT NO. : 6,734,903 B1
DATED : May 11, 2004
INVENTOR(S) : Takeda et al.

It is certified that error appears in the above-identified patent and that said Letters Patent is hereby corrected as shown below:

Title page,
Item [56], References Cited, FOREIGN PATENT DOCUMENTS, for referencce "JP 60149269" please delete "8/1995" and insert therefore -- 8/1985 --; please delete "JP 0149269    6/1985"; and please delete "JP 6139340    10/1992"

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO.    : 6,734,903 B1
DATED         : May 11, 2004
INVENTOR(S)   : Takeda et al.

It is certified that error appears in the above-identified patent and that said Letters Patent is hereby corrected as shown below:

Column 5,
Line 50, delete "Fig. 9 is a timing chart" and insert therefor -- FIGS. 9A to 9C are timing charts --.
Line 65, insert -- including variable angle prism method, -- after "embodiments;".

Column 10,
Line 20, delete "other" and insert therefor -- other --.

Column 14,
Line 31, after "embodiment." insert -- Reference numeral 301 denotes a recording system including CCDs. A trichromatic separation prism 310 separates light from an object to be photographed into three colors, red (R), green (G), and blue (B), and supplies these three light components to three CDs 311*a* to 311*c*. R, G, and B filters are adhered to the CCDs 311*a*, 311b, and 311c, respectively. In the fourth embodiment, the pixel arrangements in the three CCDs 311*a* to 311*c* are precisely identical. That is, no pixel shift is done between the CCDs, so an image of an object to be photographed is projected at the same position in each CCD. Reference numeral 312 denotes an A/D converter for converting outputs from the CCDs 311*a* to 311*c* into digital signals; and 313, a memory. The RGB image data obtained by the CCDs 311*a* to 311*c* are recorded in a recording unit 314, such as semiconductor memory card or a hard disk, via the A/D converter 312 and the memory 313. This recording operation is controlled by a CPU 315.

An image sensing/pickup system 302 controls exposure, focus detection, zooming, and the like processing. A VAP 303 is a pixel shifting means for changing the relative position of an image of an object with respect to each CCD. As explained in Japanese Patent Laid-Open No. 2-124518, the VAP 303 is an optical element formed by sealing a transparent elastic body between parallel --.

Column 15,
Line 13, delete "FIG. 9" and insert therefor -- FIGS 9A to 9C --.
Line 40, delete "Reference".
Delete lines 41-64.
Line 65, delete "body between parallel".

UNITED STATES PATENT AND TRADEMARK OFFICE
CERTIFICATE OF CORRECTION

PATENT NO. : 6,734,903 B1
DATED : May 11, 2004
INVENTOR(S) : Takeda et al.

It is certified that error appears in the above-identified patent and that said Letters Patent is hereby corrected as shown below:

Column 19,
Line 13, delete "photographing" and insert therefor -- sensing --.
Line 16, delete "image" and insert therefor -- images --.
Line 29, after "number" delete "of not less than" and insert -- greater than or equal to 2 --.
Line 32, delete "photographed" and insert -- sensed --.

Column 20,
Line 4, delete "photographing" and insert -- sensing --.
Line 46, delete "photographs" and insert -- senses --.

Signed and Sealed this

Twenty-fifth Day of October, 2005

JON W. DUDAS
*Director of the United States Patent and Trademark Office*